(12) United States Patent
Edmonds et al.

(10) Patent No.: US 12,648,543 B1
(45) Date of Patent: Jun. 9, 2026

(54) BOWL

(71) Applicant: Edmonds Outdoors, LLC, La Vergne, TN (US)

(72) Inventors: Addison Edmonds, Nashville, TN (US); Gene Andrew Sparks, Nashville, TN (US); Colton Gray Breeding, Nashville, TN (US)

(73) Assignee: Edmonds Outdoors, LLC, La Vergne, TN (US)

( * ) Notice: Subject to any disclaimer, the term of this patent is extended or adjusted under 35 U.S.C. 154(b) by 118 days.

(21) Appl. No.: 18/777,865

(22) Filed: Jul. 19, 2024

Related U.S. Application Data

(60) Provisional application No. 63/527,776, filed on Jul. 19, 2023.

(51) Int. Cl.
*A01K 5/01* (2006.01)

(52) U.S. Cl.
CPC .................................. *A01K 5/0114* (2013.01)

(58) Field of Classification Search
CPC .... A01K 5/0114; A01K 7/005; A01K 5/0128; A01K 5/0135; Y10S 224/926; A47G 23/0225; A47G 19/02
See application file for complete search history.

(56) References Cited

U.S. PATENT DOCUMENTS

| | | | | |
|---|---|---|---|---|
| 7,600,486 | B2 * | 10/2009 | Ellis | A01K 7/005 |
| | | | | 119/61.5 |
| 8,342,350 | B2 * | 1/2013 | Jain | A01K 5/0135 |
| | | | | 220/636 |
| D700,752 | S * | 3/2014 | Gilkey | D30/129 |
| 9,095,117 | B1 * | 8/2015 | Kumar | A01K 7/005 |
| 12,284,992 | B2 * | 4/2025 | McIntosh | A01K 7/005 |
| 2007/0034161 | A1 * | 2/2007 | Thompson | A01K 5/0114 |
| | | | | 119/61.5 |
| 2016/0229590 | A1 * | 8/2016 | Smaldone | A01K 7/005 |
| 2017/0238737 | A1 * | 8/2017 | Chan | A47J 19/04 |
| 2022/0201973 | A1 * | 6/2022 | Kim | B65D 21/0233 |

* cited by examiner

*Primary Examiner* — Shawn M Braden
(74) *Attorney, Agent, or Firm* — Holland & Knight LLP; Matthew C. Cox; Forrest S. Tinnin

(57) ABSTRACT

The present disclosure provides for a container apparatus. The apparatus may include a bowl, a retainer, and a base. The bowl may include one or more bosses protruding from a bottom side of the bowl. The retainer may include one or more openings and one or more pins protruding from a top side of the retainer. The top side of the retainer may be disposed on the bottom side of the bowl. The base may include one or more base pads protruding from a bottom side of the base and one or more holes. The Base may be positioned between the retainer and the bowl such that a top side of the base is disposed on the bottom side of the bowl and the bottom side of the base is disposed on the top side of the retainer. The base pads may extend through the openings.

24 Claims, 36 Drawing Sheets

BOWL

CROSS-REFERENCE TO RELATED APPLICATION

This application is a non-provisional of and claims priority to and benefit of U.S. Provisional Patent Application No. 63/527,776, filed Jul. 19, 2023, entitled Bowl, which is hereby incorporated by reference in its entirety.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present disclosure relates generally to apparatuses for providing food or water to animals, and more particularly to stable and portable bowls.

Conventional apparatuses for providing food or water to animals include bowls, buckets, troughs, and other simple container devices for holding food. Some conventional animal food/water containers typically fail to include features that stabilize the containers on the ground when an animal is using the food bowl (e.g., consuming the food or water). For example, when using a conventional container, an animal may push the container across a ground surface as they consume the food or water, which may result in the food or water spilling to the floor, among other issues.

Others have tried to overcome this problem by providing a tactile (e.g., non-slip) surface to the bottom of the container. However, such tactile surfaces on the bottom of conventional containers are typically subject to wear-and-tear, necessitating replacement of the container. Moreover, such tactile surfaces, when positioned on the ground surface for a prolonged period of time, may allow the proliferation of mold underneath the container, as well as creating a disadvantageous suction engagement between the bottom of the container and the ground surface.

Other conventional containers typically include a removable lid. In order to facilitate portability of the container with the lid, the lid may be attached to a bottom of the container when the container is in use. However, attaching the removable lid to the bottom of the container typically places a smooth surface of the removable lid against the ground surface. This may eliminate any advantages of an aforementioned tactile surface on the bottom of the conventional container, while still allowing for the proliferation of mold underneath the bowl.

What is needed then are improvements in apparatuses and methods for providing food and water to animals.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure is a container apparatus (apparatus). The apparatus may include a bowl, a retainer, and a base. The bowl may include including a top side, a bottom side, and one or more bosses protruding from the bottom side. The retainer may include a top side, a bottom side, one or more openings, and one or more pins protruding from the top side of the retainer. In some arrangements, the top side of the retainer is disposed on the bottom side of the bowl. The base may include a top side, a bottom side, one or more base pads protruding from the bottom side of the base, and one or more holes. In some arrangements, the base is positioned between the retainer and the bowl such that the top side of the base is disposed on the bottom side of the bowl and the bottom side of the base is disposed on the top side of the retainer. In various embodiments, the base pads extend through the openings, the bosses extend through the holes, and the pins extend through the holes and engage the bosses.

In other embodiments of the present disclosure, the apparatus includes a bowl, a retainer, a base, and a lid. The bowl may include a top side and a bottom side. The retainer may include a top side, a bottom side, and one or more openings. In some arrangements, the top side of the retainer is disposed on the bottom side of the bowl. The base may include a top side, a bottom side, and one or more base pads protruding from the bottom side of the base. In some arrangements, the base is positioned between the retainer and the bowl such that the top side of the base is disposed on the bottom side of the bowl and the bottom side of the base is disposed on the top side of the retainer. The lid may include a top side and a bottom side. In various arrangements, the lid is configured to be disposed on the top side of the bowl or disposed on the bottom side of the retainer.

Another aspect of the present disclosure is a method of providing a container. The method may include providing a bowl and a base. The bowl may include a top side, a bottom side, and one or more bosses protruding from the bottom side. The base may include a top side, a bottom side, one or more base pads protruding from the bottom side of the base, and one more holes. The method may further include positioning the base relative to the bowl such that the top side of the base is engaged with the bottom side of the bowl and the bosses extend through the holes. The method may further include providing a retainer. The retainer may include a top side, a bottom side, one or more openings, and one or more pins protruding from the top side of the retainer. The method may further include attaching the retainer to the bowl such that the top side of the retainer is engaged with the bottom side of the bowl. In various arrangements, the base pads extend through the openings, the pins are engaged with the bosses, and the base is secured to the bowl.

Numerous other objects, advantages and features of the present disclosure will be readily apparent to those of skill in the art upon a review of the following drawings and description of a preferred embodiment.

DETAILED DESCRIPTION

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

Figure 1:
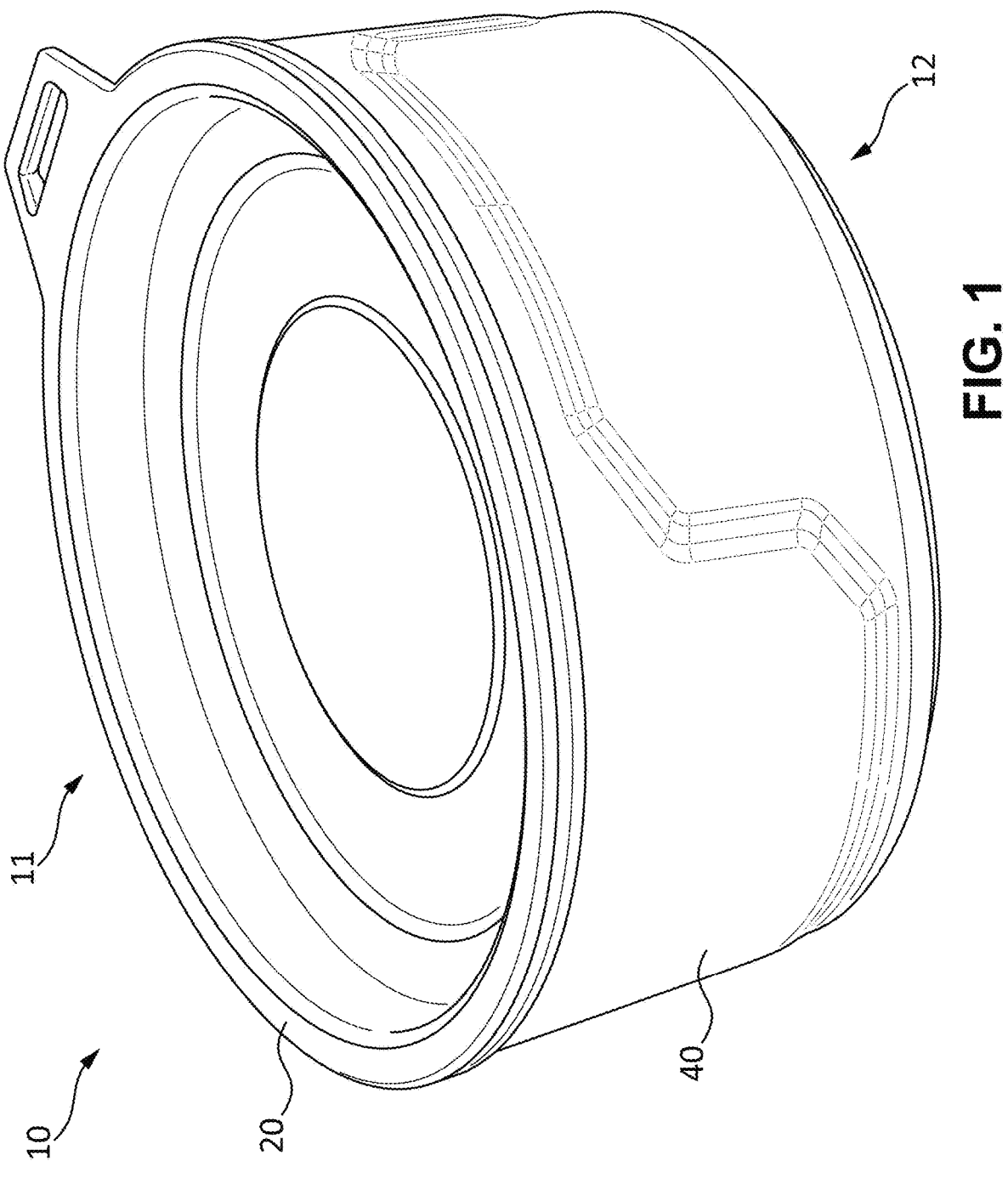
FIG. 1 is a top perspective view of an embodiment of an apparatus with a bowl, a base, a retainer, and a lid for providing food to an animal.
Figure 2:
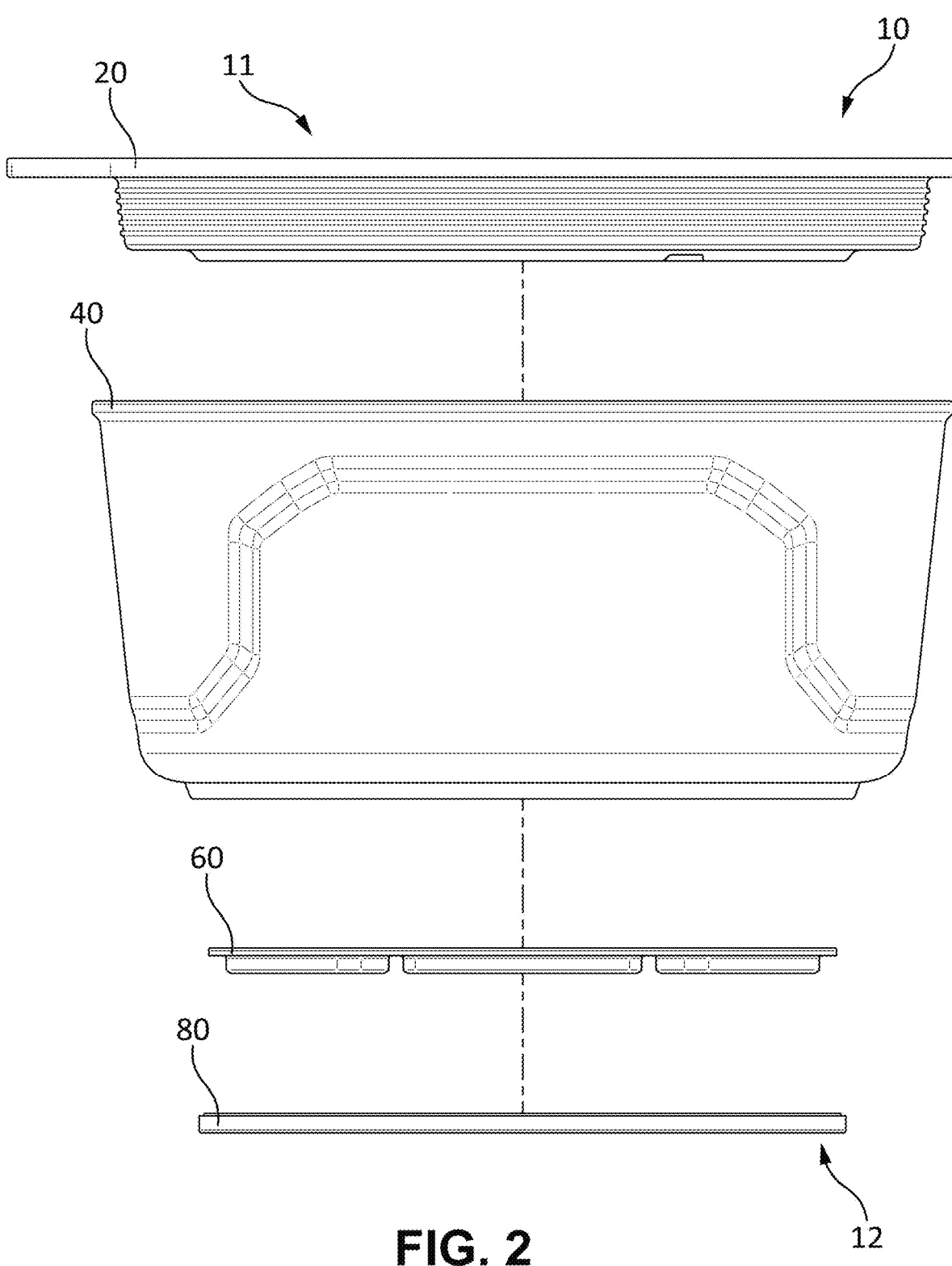
FIG. 2 is a side exploded view of an embodiment of the apparatus of FIG. 1
Figure 33:
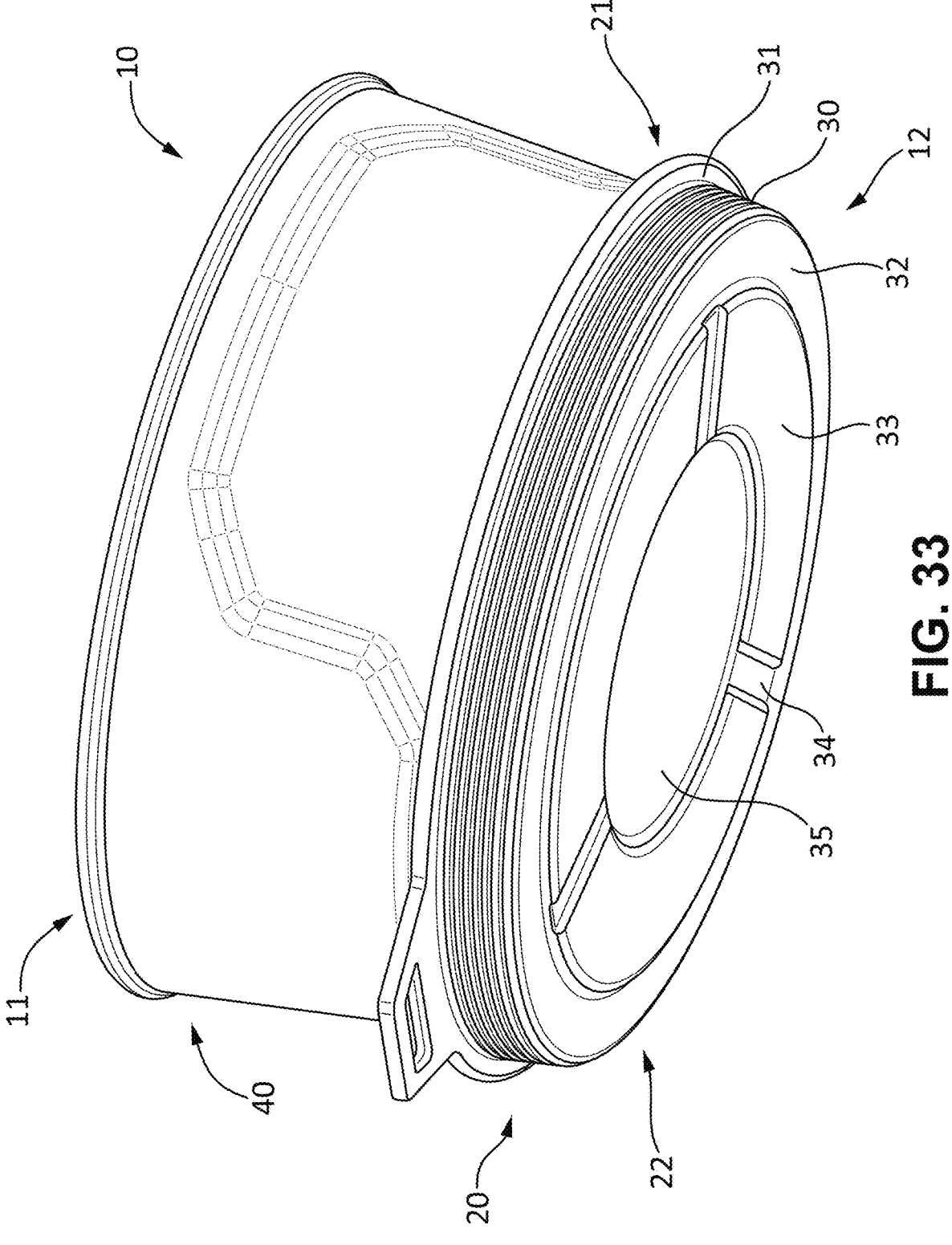
FIG. 33 is a bottom perspective view of an another embodiment of the apparatus of FIG. 1 with the lid assembled to a bottom of the bowl.
Figure 34:
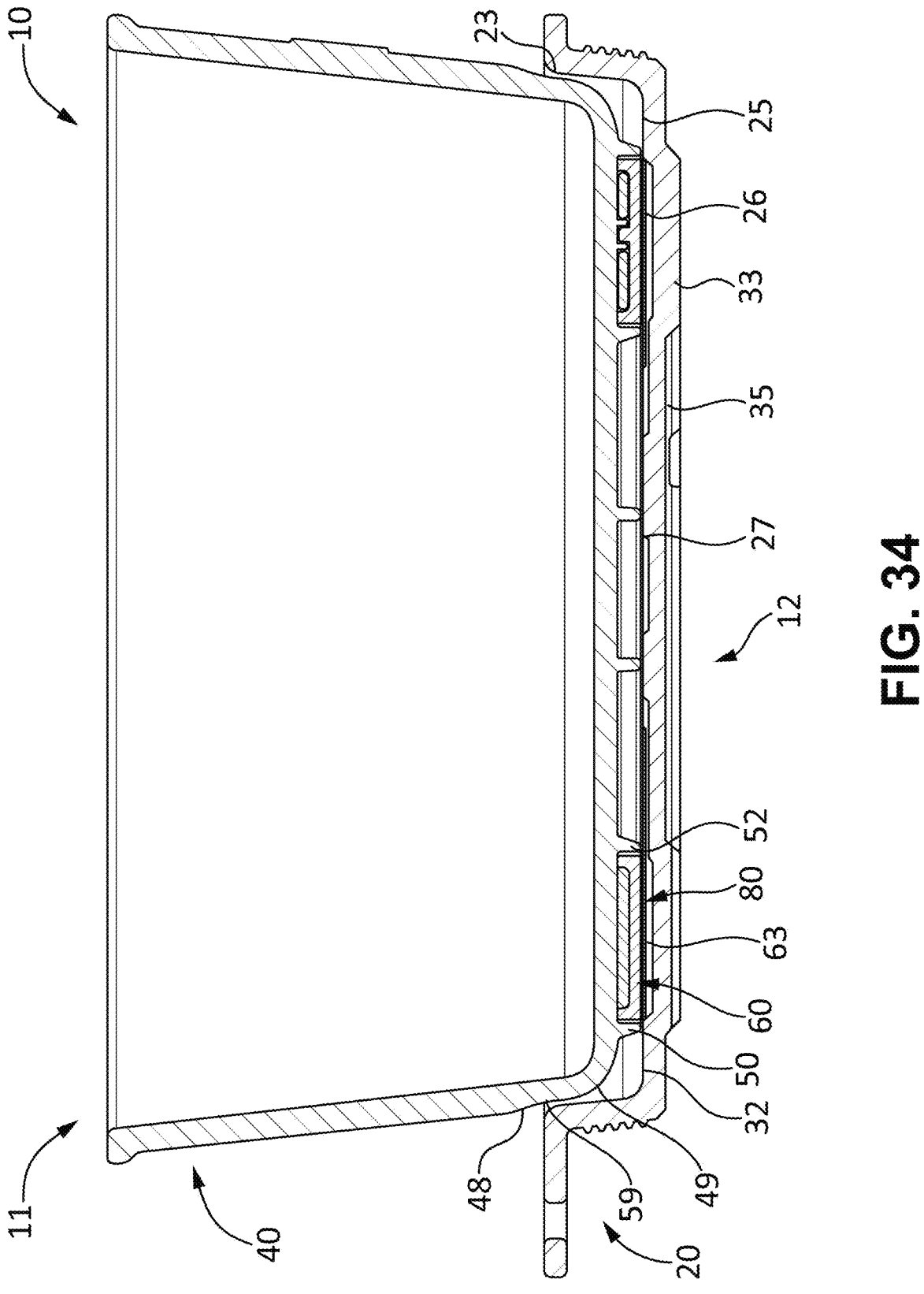
FIG. 34 is a side cross-sectional view of an embodiment of the apparatus of FIG. 1 with the lid assembled to a bottom of the bowl.
Figure 35:
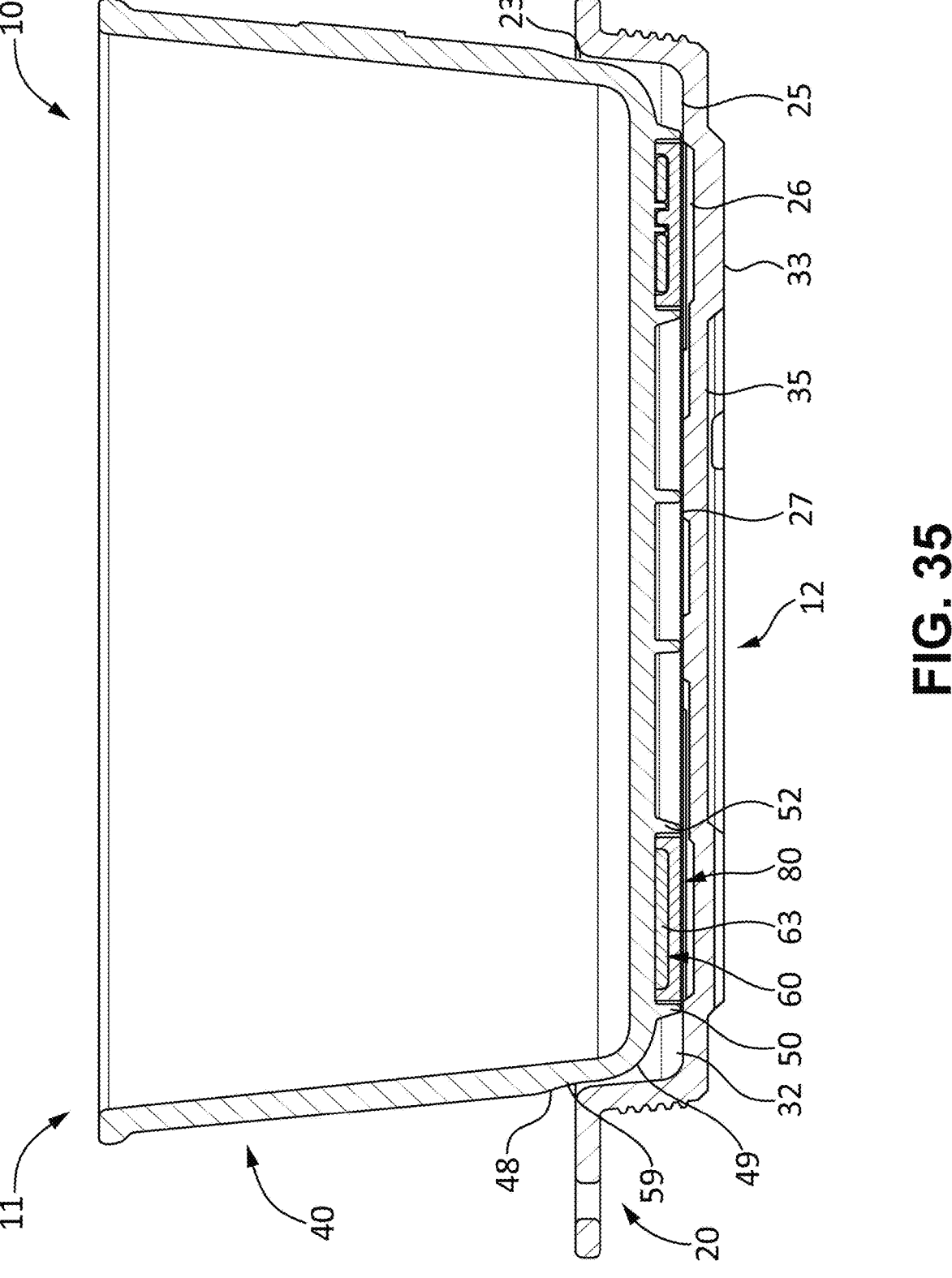
FIG. 35 is a side cross-sectional view of the another embodiment of the apparatus of FIG. 1 with the lid assembled to a bottom of the bowl.

Referring now to FIGS. 1-2, the present disclosure in some embodiments includes a container apparatus (apparatus) 10 to hold food or water for animal consumption. FIG. 1 depicts a bottom perspective view of the apparatus 10, and FIG. 2 depicts a side-exploded view of the apparatus 10, according to various embodiments. In some embodiments, the apparatus 10 includes a bowl 40 (which may be configured to hold the foot or water) and a base 60. In further embodiments, the apparatus 10 further includes a retainer 80. In even further embodiments, the apparatus 10 include a lid 20. The apparatus 10 may include a top side 11 and a bottom side 12. As shown with particular reference to FIG. 2, the lid 20, the base 60, and the retainer 80 may be assembled to the bowl 40. However, the lid 20 may be removable from the top side 11 of the apparatus 10 and, in an alternative arrangement of the apparatus 10 as depicted with reference to FIGS. 33-35, provided at the bottom side 12 of the apparatus 10. As discussed in greater detail below, whether the apparatus 10 is provided as shown with reference to FIGS. 1-2, or as shown with reference to FIGS. 33-35, the apparatus 10 may provide a tactile (e.g., non-slip) surface at the bottom side 12 of the apparatus 10 that provides a stable engagement with a ground surface when the apparatus 10 is placed on the ground surface, while also providing features that prevent the proliferation of mold underneath the apparatus 10.

Figure 3:
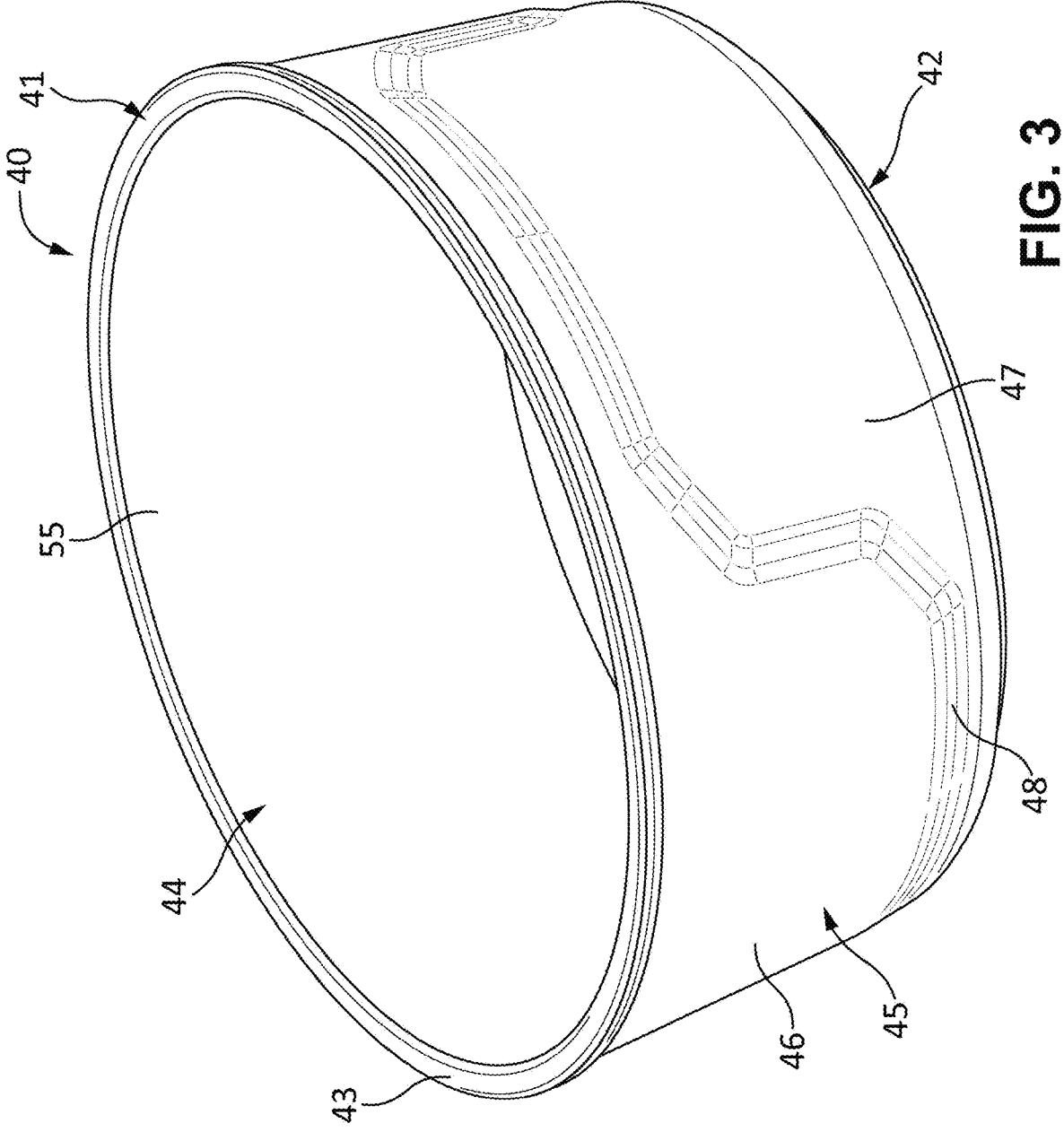
FIG. 3 is a top perspective view of an embodiment of the bowl of FIG. 1.
Figure 4:
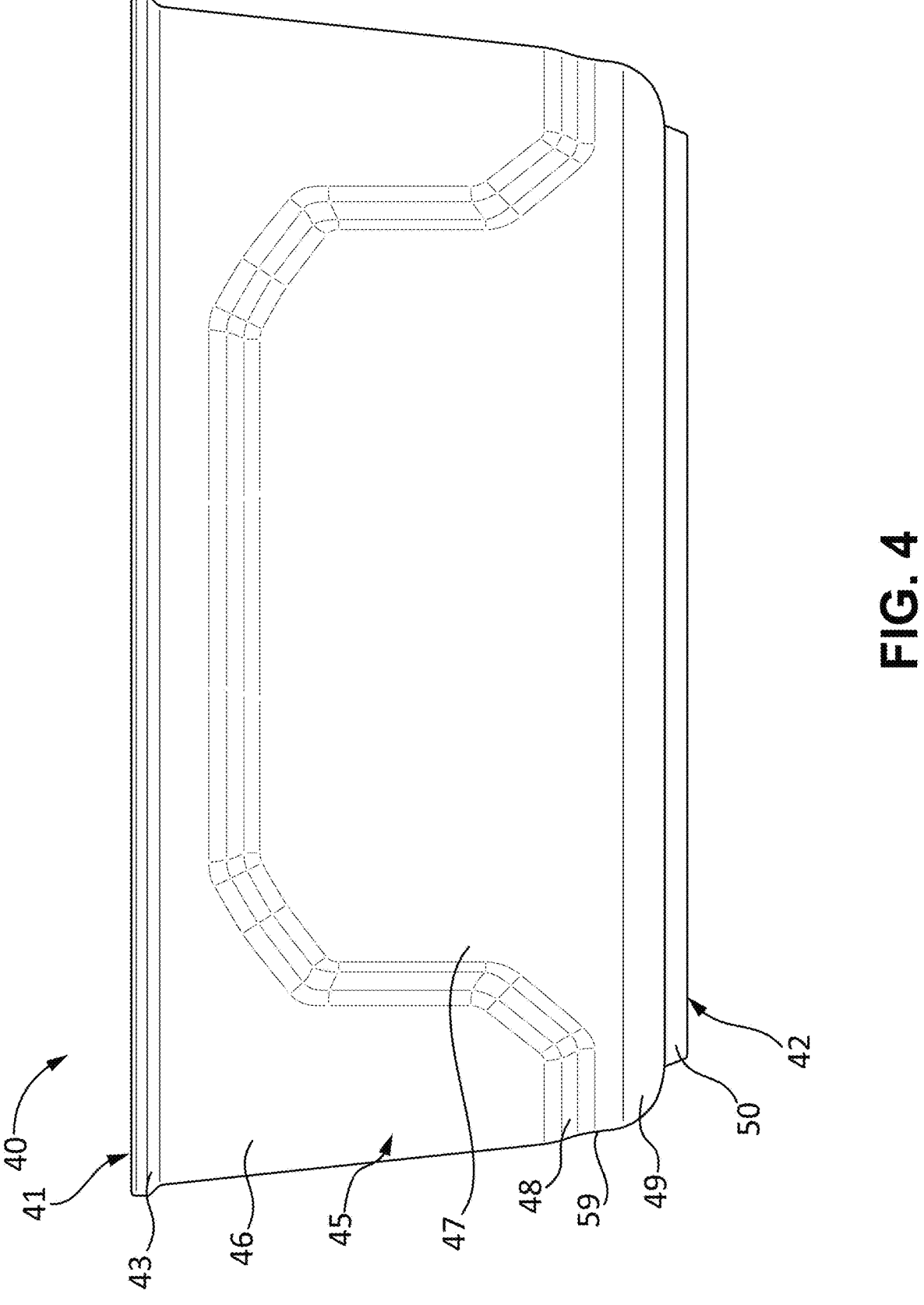
FIG. 4 is a side view of an embodiment of the bowl of FIG. 1.
Figure 5:
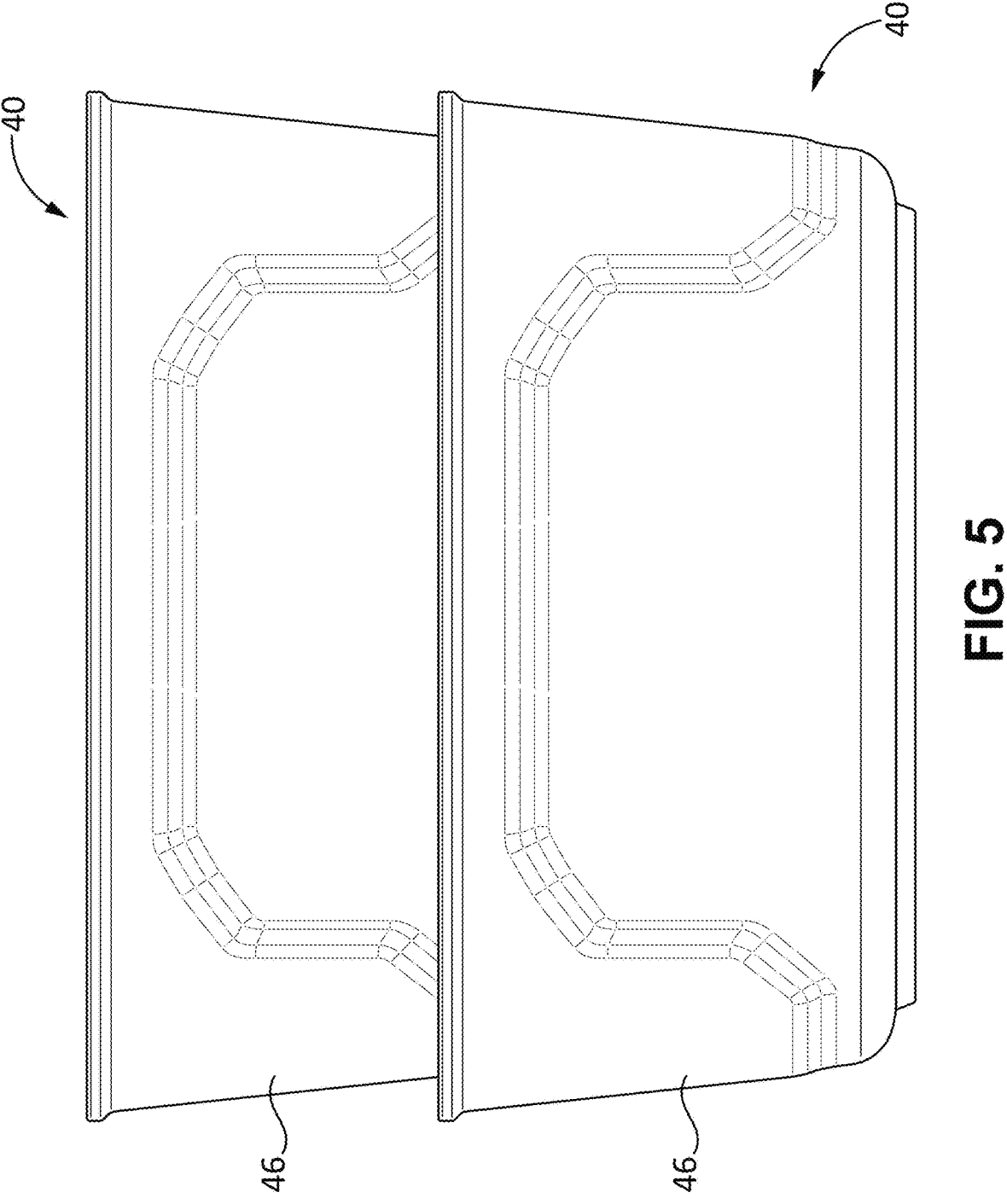
FIG. 5 is a side view of an embodiment of the bowl of FIG. 1 assembled with another bowl.
Figure 6:
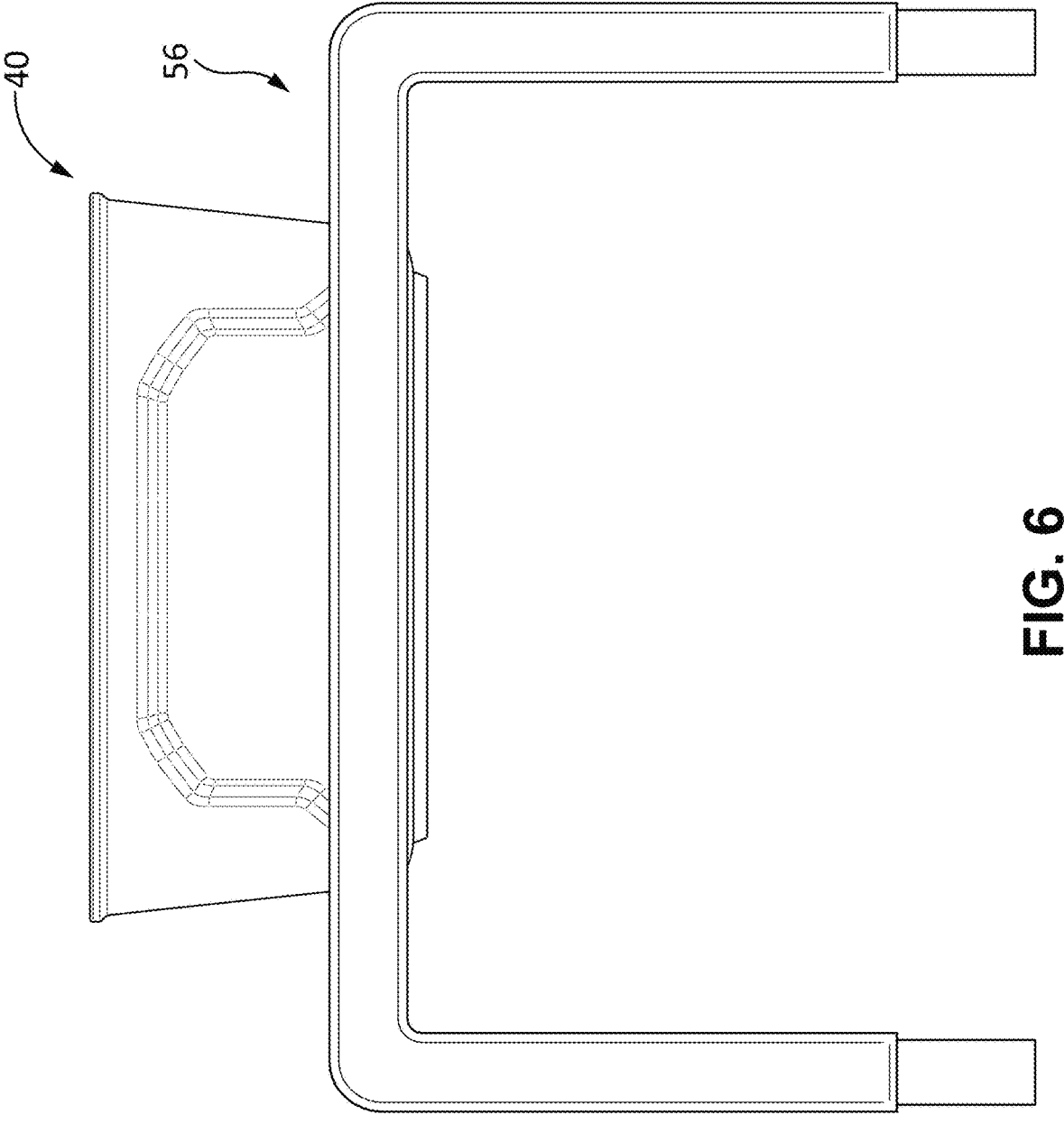
FIG. 6 is a side view of an embodiment of the bowl of FIG. 1 assembled with a bowl stand.
Figure 7:
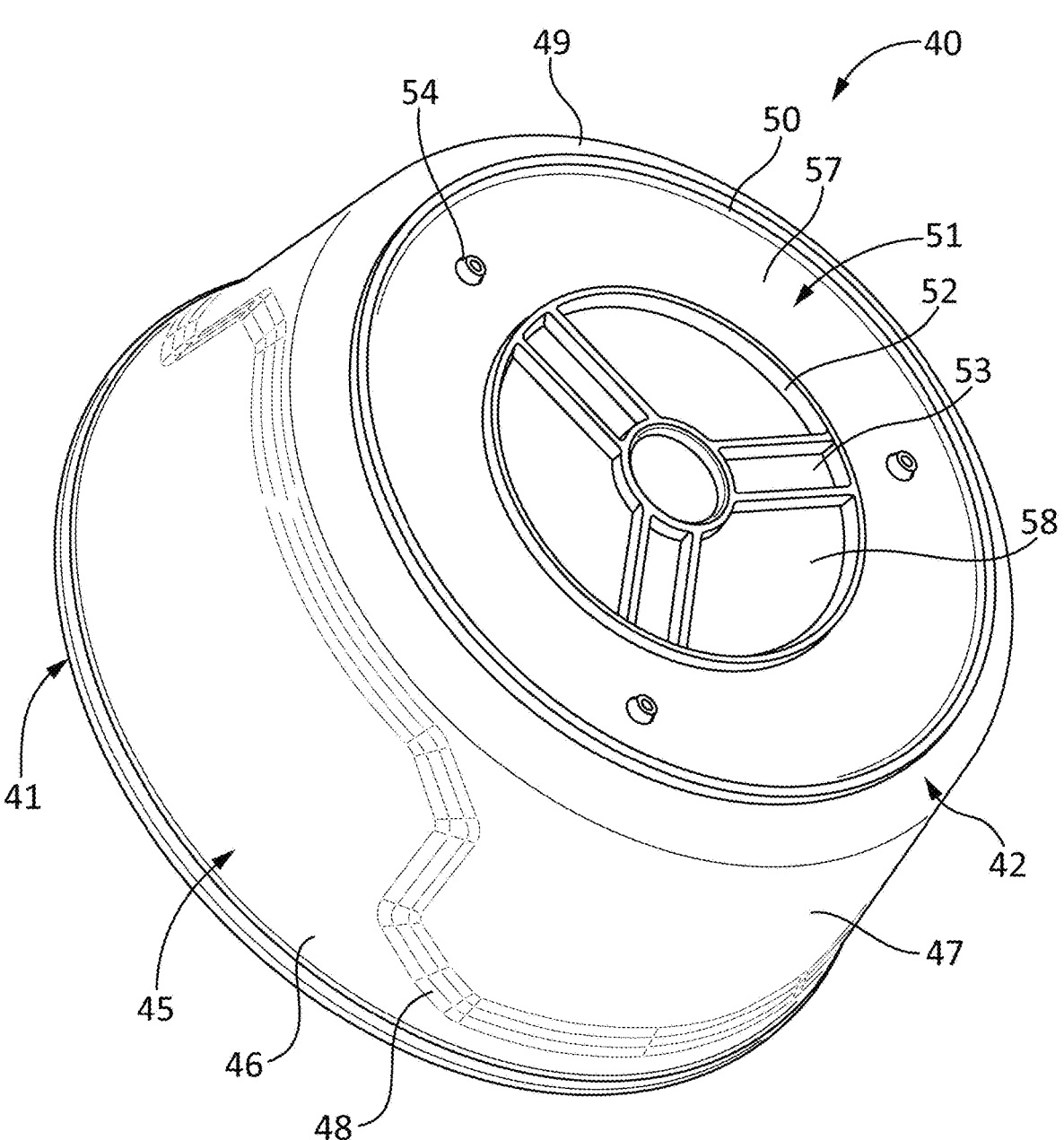
FIG. 7 is a bottom perspective view of an embodiment of the bowl of FIG. 1.
Figure 8:
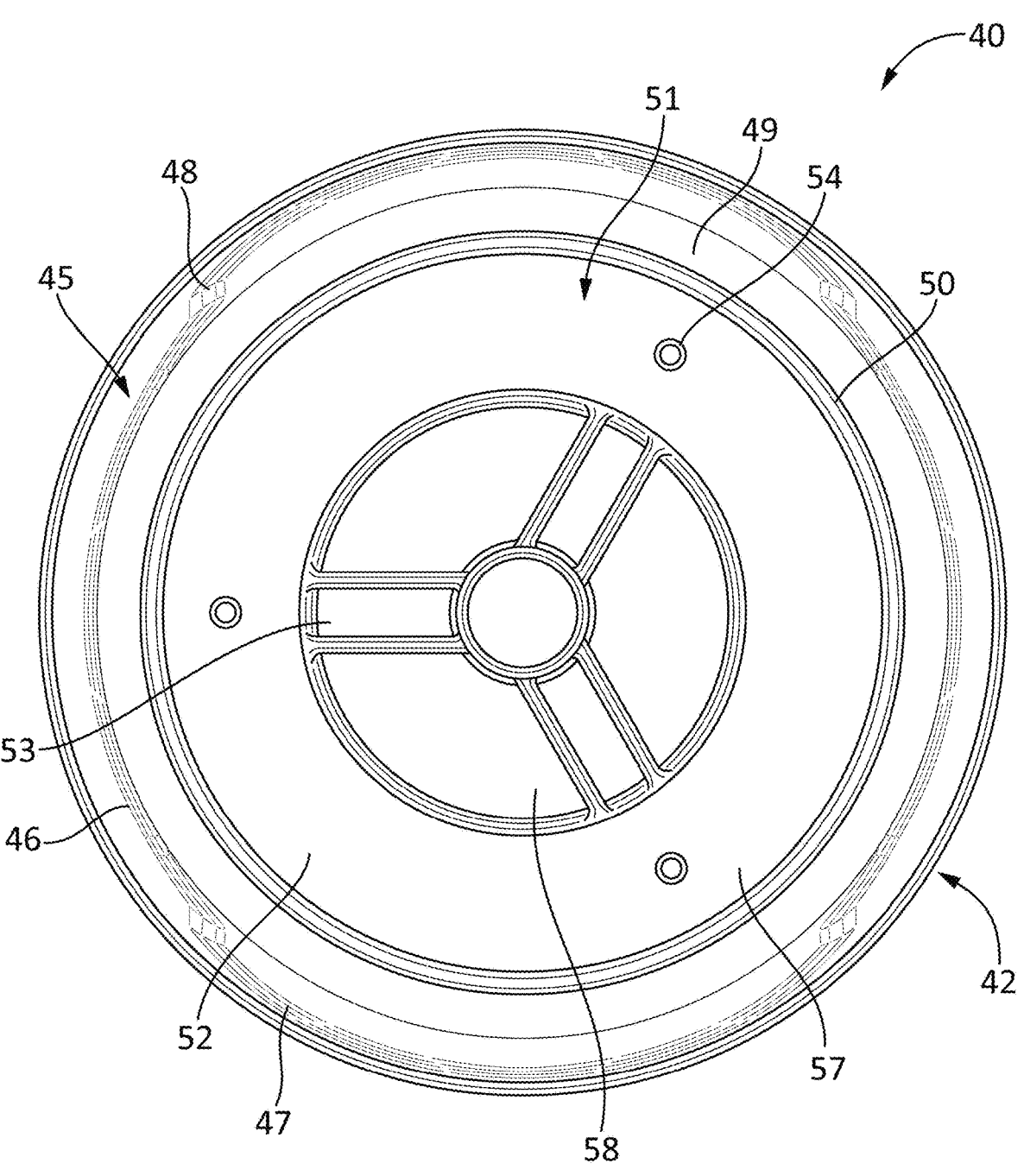
FIG. 8 is a bottom view of an embodiment of the bowl of FIG. 1.
Figure 9:
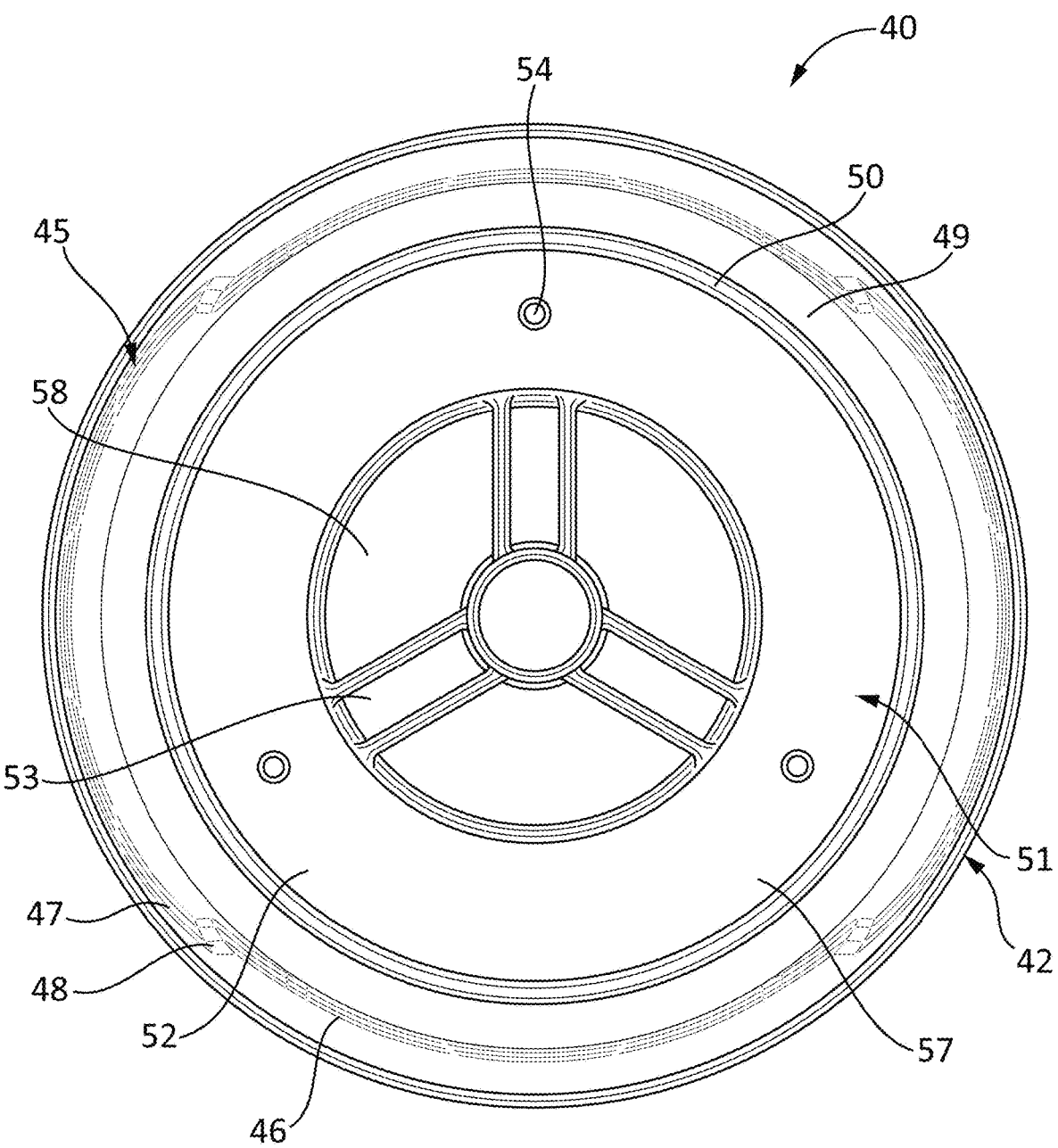
FIG. 9 is a bottom view of an embodiment of the bowl of FIG. 1.
Figure 10:
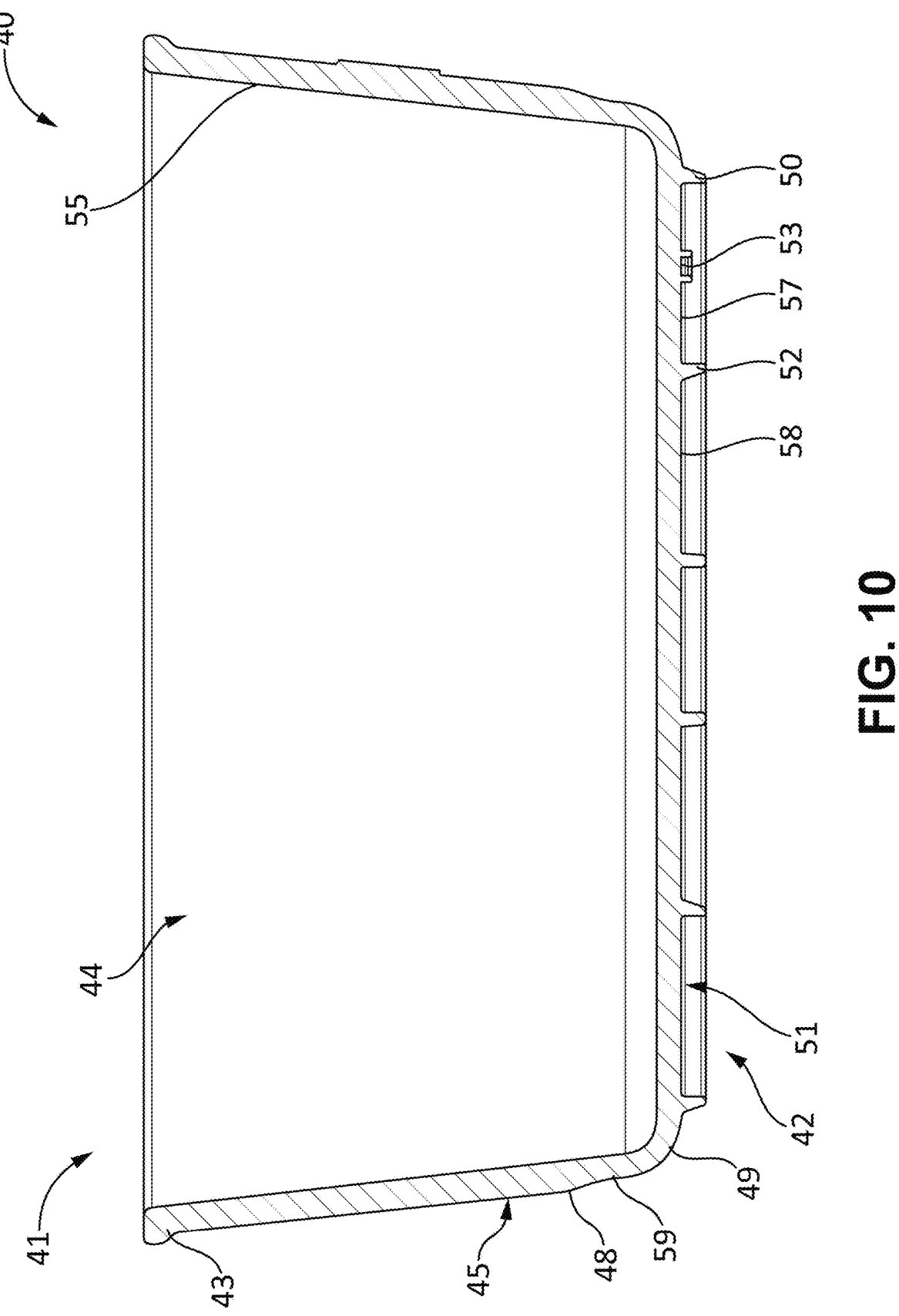
FIG. 10 is a side cross-sectional view of an embodiment of the bowl of FIG. 1

Referring now to FIGS. 3-10, the bowl 40 is shown in greater detail, according to some embodiments of the present disclosure. FIG. 3 depicts a top perspective view of the bowl 40; FIGS. 4-6 depict side views of the bowl 40; FIG. 7 depicts a bottom perspective view of the bowl 40; FIGS. 8-9 depict bottom views of the bowl 40; and FIG. 10 depicts a side cross-sectional view of the bowl 40, according to various embodiments. The bowl 40 may be constructed of any suitable material including, but not limited to, glass-filled nylon or aliphatic polyketone (POK). In this sense, the bowl 40 may be constructed of a material that is abrasion-resistant (e.g., resistant to animal chewing), as well as heat resistant. The bowl 40 may include a top side 41, which forms an upper bowl lip 43, and a bottom side 42.

In some embodiments, and referring particularly to FIGS. 3-4, the bowl 40 includes an inner region 44 (e.g., where food may be stored) formed within an inner bowl surface 55 of the bowl 40 extending between the top and bottom sides 41, 42. Similarly, the bowl 40 may include an outer bowl surface 45 extending between top and bottom sides 41, 42. In some embodiments, the outer bowl surface 45 includes an inner bowl surface region 47 and an outer bowl surface region 46 (further from the inner bowl surface 55 than the inner bowl surface region 47), which interface via a ramp 48.

In some embodiments, the outer bowl surface region 46 provides an embellished surface on which information (e.g., logos, names, etc.) may be engraved or etched in order to associate the apparatus 10 with a particular animal or owner of the animal. In other embodiments, the outer bowl surface region 46 provides a surface on which an information panel may be attached. As a first example, a metal or magnetic plate may be disposed on or within the material of the bowl 40 and aligned with the outer bowl surface region 46. Such a metal or magnetic plate may be used to secure a magnetic or metal (respectively) information panel to the bowl 40. As a second example, an information panel may be secured to the outer bowl surface region 46 via a mechanical fastener (e.g., clamp, screws, crimping etc.) or an adhesive.

Referring particularly to FIG. 5, the outer bowl surface region 46 or the ramp 48 may engage the inner bowl surface 55 of another bowl 40 when more than one bowls 40 (or, when assembled as the apparatus 10, more than one apparatuses 10) are stacked together for storage. Referring particularly to FIG. 6, the ramp 48 may provide a retaining surface on which the apparatus 10 may rest if the apparatus 10 is placed in an aperture of a bowl stand 56.

In some embodiments, and referring particularly to FIGS. 7-10, the bottom side 42 of the bowl 40 includes a lower bowl surface 51, which interfaces with the outer bowl surface 45 via a lower bowl lip 49. The lower bowl surface 51 may feature an annular outer bowl ridge 50 and an annular inner bowl ridge 52 formed concentrically within the outer bowl ridge 50. For example, the outer and inner bowl ridges 50, 52 may protrude from the lower bowl surface 51 (e.g., away from the top side 41 of the bowl 40). The inner bowl ridge 52 may form a circular lower bowl cavity 58 on the lower bowl surface 51 within the inner bowl ridge 52. Likewise, the outer and inner bowl ridges 50, 52 may form an annular lower bowl cavity 57 on the lower bowl surface 51 between the outer and inner bowl ridges 50, 52. In some embodiments, one or more spokes 53 protrude as ridges (e.g., pairs of ridges) from lower bowl surface 51 (e.g., away from the top side 41 of the bowl 40) within the circular lower bowl cavity 58. The spokes 53 may function as heat sinks to prevent formation of sinking or cupping about the circular lower bowl cavity 58 when a warm or hot food is stored in the apparatus 10.

In some embodiments, the lower bowl surface 51 features one or more bosses 54 protruding from the bottom side 42 of the bowl 40. Accordingly, the bowl 40 may include the top side 41, the bottom side 42, and one or more bosses 54 protruding from the bottom side 42. In particular, the bosses 54 may protrude from the bottom side 42 of the bowl 40 within the annular lower bowl cavity 57. In some embodiments, the bosses 54 are distributed circumferentially about the profile of the annular lower bowl cavity 57. For example, the lower surface 51 may include three bosses 54 arranged as such. As described below with reference to FIGS. 21-30, the bosses 54 may facilitate securing the base 60 to the bowl 40, as well as the retainer 80 to the bowl 40 and the base 60 secured thereto. In this sense, the bosses 54 may be operable as locator bosses, guide holes, etc.

Referring particularly to FIGS. 4 and 10, a crease 59 may be formed between the ramp 48 and the lower bowl lip 49.

As described in greater detail below with reference to FIGS. 33-35, the crease 59 may facilitate a secure engagement region between the lid 20 and the bowl 40 when the lid 20 is assembled to the bottom side 42 of the bowl 40 (e.g., at the bottom side 12 of the apparatus 10).

Figure 11:
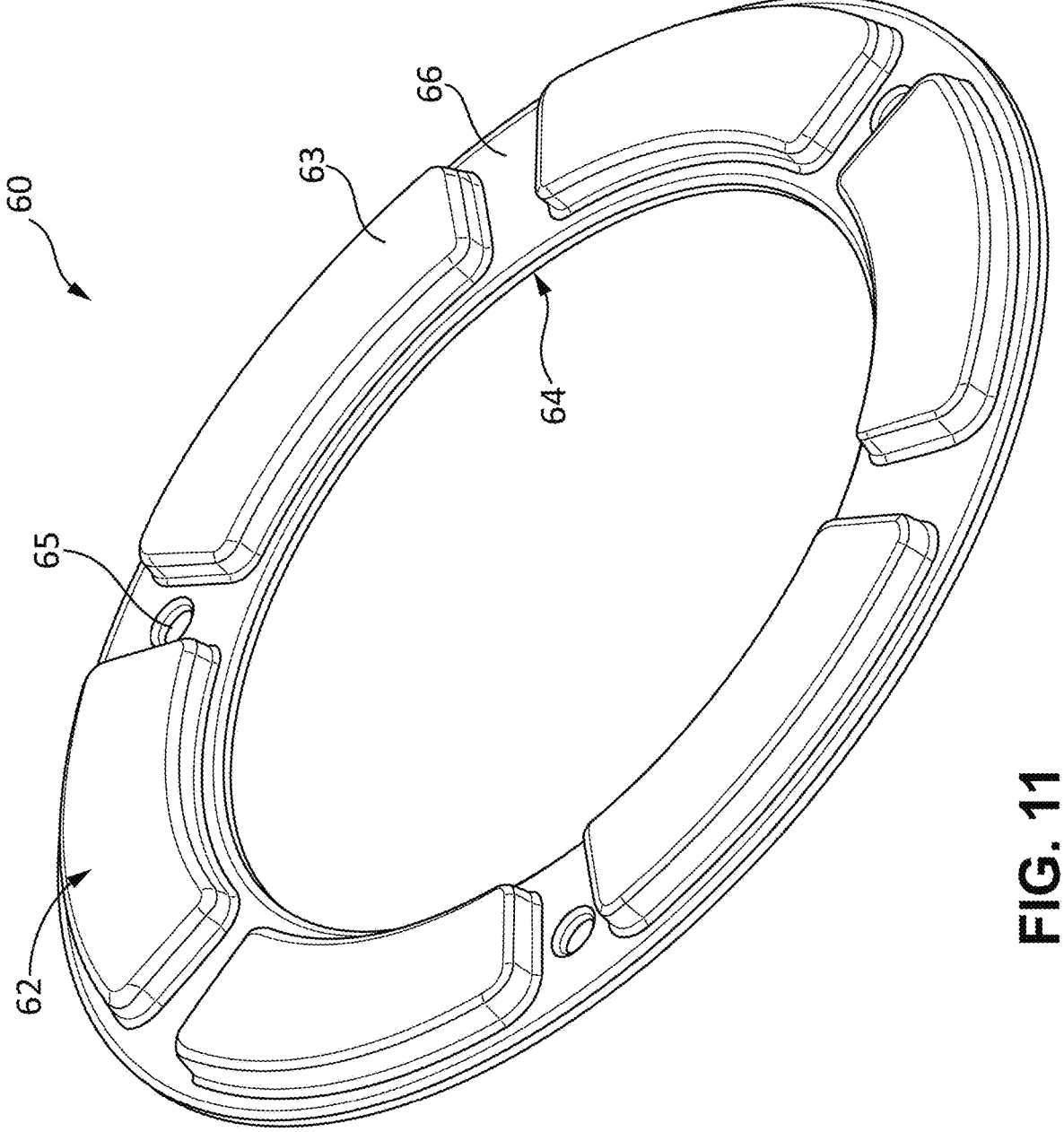
FIG. 11 is a bottom perspective view of an embodiment of the base of FIG. 1.
Figure 12:
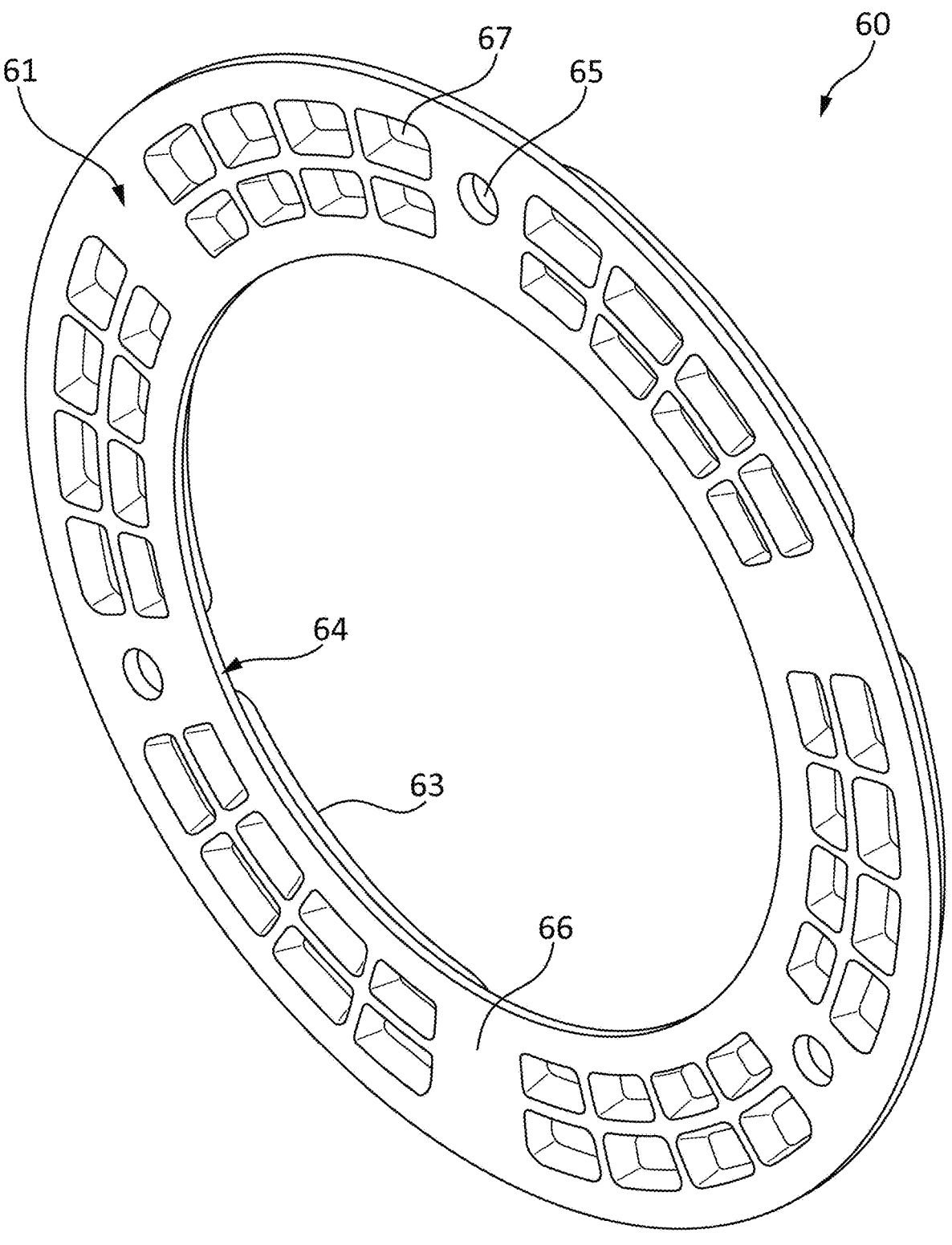
FIG. 12 is a top perspective view of an embodiment of the base of FIG. 1.

Referring now to FIGS. 11-12, the base 60 is shown in greater detail, according to some embodiments of the present disclosure. FIG. 11 depicts a bottom perspective view of the base 60, and FIG. 12 depicts a top perspective view of the base 60, according to various embodiments. The base 60 may be constructed of any suitable material including, but not limited to, thermoplastic rubber (TPR), thermoplastic polyurethane (TPU), or thermoplastic elastomer (TPE). In this sense, the base 60 may be constructed of a material that is flexible and abrasion-resistant, while providing a non-slip engagement with a ground surface when the apparatus 10 is assembled as shown with reference to FIG. 1 and positioned such that the bottom 12 of the apparatus 10 is placed on the ground surface. The base 60 may include a top side 61 and a bottom side 62.

In some embodiments, the base 60 forms an annular shape defined by an annular base body 64. In further embodiments, the base 60 includes one or more holes 65. In this sense, the one or more holes 65 may extend through the base body 64. As depicted with reference to FIGS. 21-23, the holes 65 may be positioned on the base body 64 such that, when the base 60 is assembled with the bowl 40, the holes 65 align with the bosses 54 of the bowl 40. For example, the holes 65 may be distributed circumferentially about annular profile of the base body 64. As shown, three holes 65 may be distribute as such.

In some embodiments, and referring particularly to FIG. 11, one or more base pads 63 protrude from the base body 64 on the bottom side 62 of the base 60 (e.g., away from the top side 61 of the base 60). Accordingly, the base 60 may include the top side 61, the bottom side 62, and the one or more base pads 63 protruding from the bottom side 62. The base pads 63 may be distributed circumferentially about the annular profile of the base body 64. As shown, six base pads 63 may be distributed as such. In this sense, one or more spaces (e.g., gaps, regions without the base pads 63, etc.) 66 may be left on the base body 64 between the base pads 63. As shown, six spaces 66 may be formed by the six base pads 63.

In some embodiments, and referring particularly to FIG. 12, one or more recesses 67, in alignment with the base pads 63, extend into the base body 64 from the top side 61 of the base 60. For example, the one or more recesses 67 may be organized in regions that are aligned with the base pads 63. Accordingly, one or more regions of the recesses 67 may be distributed circumferentially about the annular profile of the base body 64, in alignment with the base pads 63. As shown, six regions of the recesses 67 may be distributed as such. Advantageously, the one or more recesses 67 may reduce an amount of material required to produce the base 60, while maintaining the structural integrity of the base pads 63.

Figure 13:
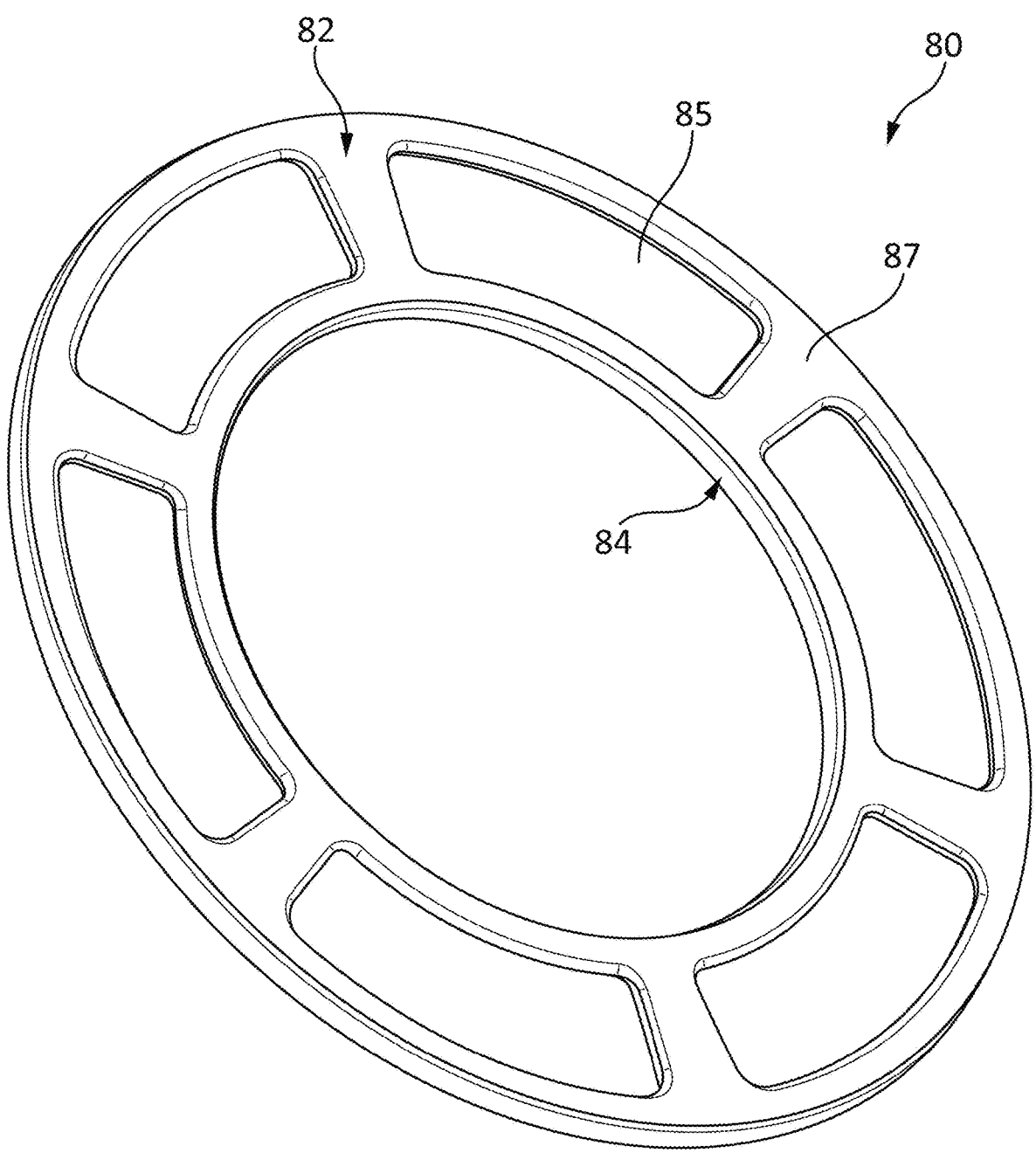
FIG. 13 is a bottom perspective view of an embodiment of the retainer of FIG. 1.
Figure 14:
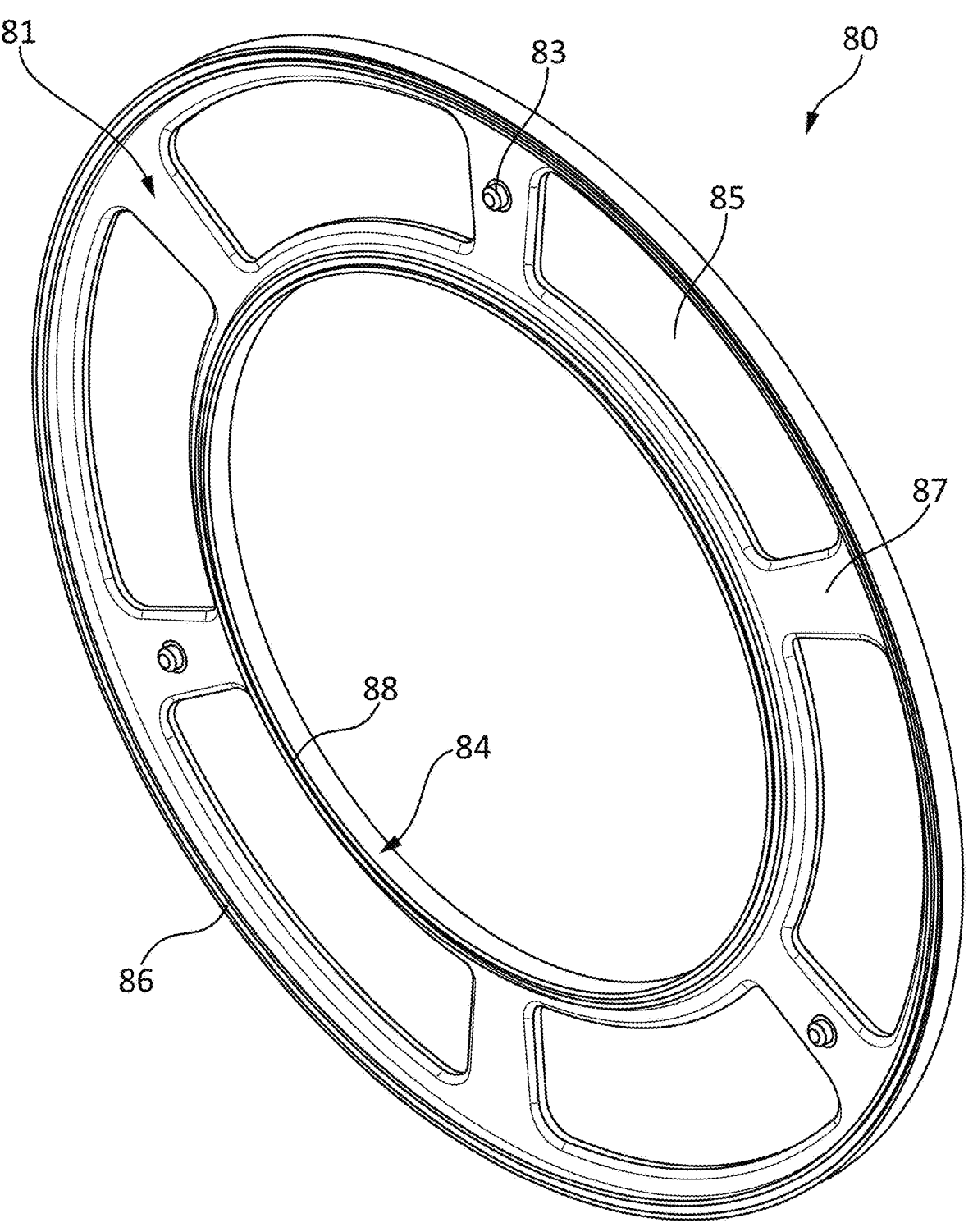
FIG. 14 is a top perspective view of an embodiment of the retainer of FIG. 1.

Referring now to FIGS. 13-14, the retainer 80 is shown in greater detail, according to some embodiments of the present disclosure. As discussed in greater detail below with reference to FIGS. 27-30, the retainer 80 may be used to secure the base 60 to the bowl 40 in order to assemble the apparatus 10 as shown in FIG. 1. FIG. 13 depicts a bottom perspective view of the retainer 80, and FIG. 14 depicts a top perspective view of the retainer 80, according to various embodiments. The retainer 80 may be made of any suitable material including, but not limited to, glass-filled nylon or POK. In this sense, the retainer 80 may be made of the same material as the bowl 40, depending on the implementation of the present disclosure. The retainer 80 may include a top side 81 and a bottom side 82.

In some embodiments, the retainer 80 forms an annular shape defined by a retainer body 84. One or more openings 85 may extend through the retainer body 84. In some embodiments, the openings 85 are distributed circumferentially about the retainer body 84. In this sense, one or more spaces (e.g., panels of material) 87 may be left on the retainer body 84 between the openings 85. As shown with reference to FIGS. 24-26, the openings 85 may be shaped to receive the base pads 63 of the base 60 when the retainer 80 is used to secure the base 60 to the bowl 40. In this sense, the openings 85 may be configured to be aligned with the base pads 63. As shown, six openings 85 may be distributed as such.

In some embodiments, and referring particularly to FIG. 14, the retainer 80 features an annular outer retainer ridge 86 and an annular inner retainer ridge 88 formed concentrically within the outer retainer ridge 86. For example, the outer and inner retainer ridges 86, 88 may protrude from the retainer body 84 on the bottom side 81 of the retainer 80.

In some embodiments, the retainer 80 includes one or more pins 83 protruding from the retainer body 84 on the bottom side 82 of the retainer 80 (e.g., away from the top side 81 of the retainer 80). Accordingly, the retainer 80 may include the top side 81, the bottom side 82, and one or more pins 83 protruding from the top side 81. As depicted with reference to FIGS. 27-30, the pins 83 may be positioned on the retainer body 84 such that, when the retainer 80 is assembled with the bowl 40 and the base 60, the pins 83 align with the bosses 54 of the bowl 40 and the holes 65 of the base 60. For example, the pins 83 may be distributed circumferentially about the annular profile of the retainer body 84. As shown, three pins 83 may be distributed as such. As described below with reference to FIGS. 27-30, the pins 83 may facilitate securing the base 60 to the bowl 40. In this sense, the pins 83 may be operable as locator pins, guides, and so on.

Figure 15:
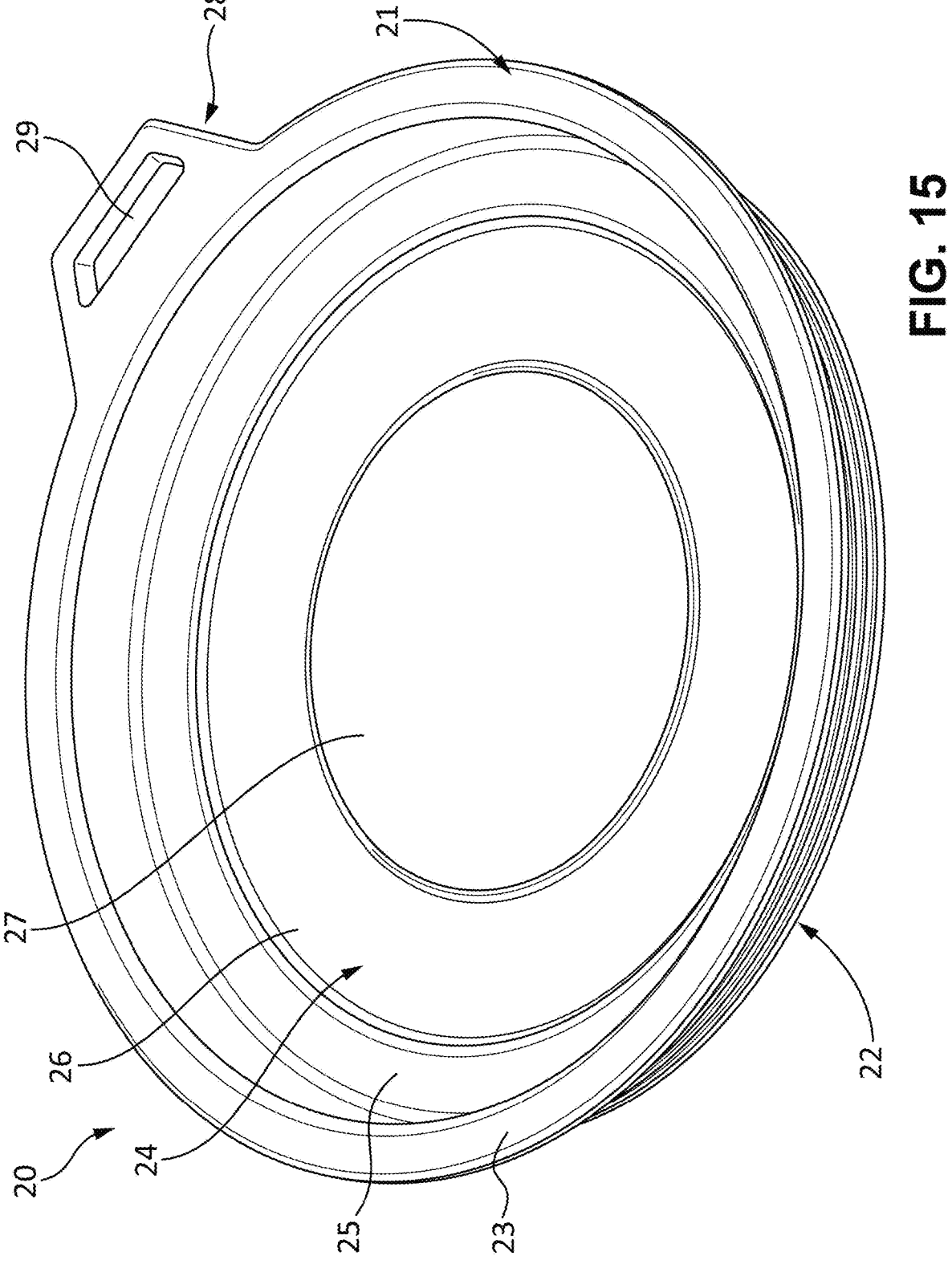
FIG. 15 is a top perspective view of an embodiment of the lid of FIG. 1.
Figure 16:
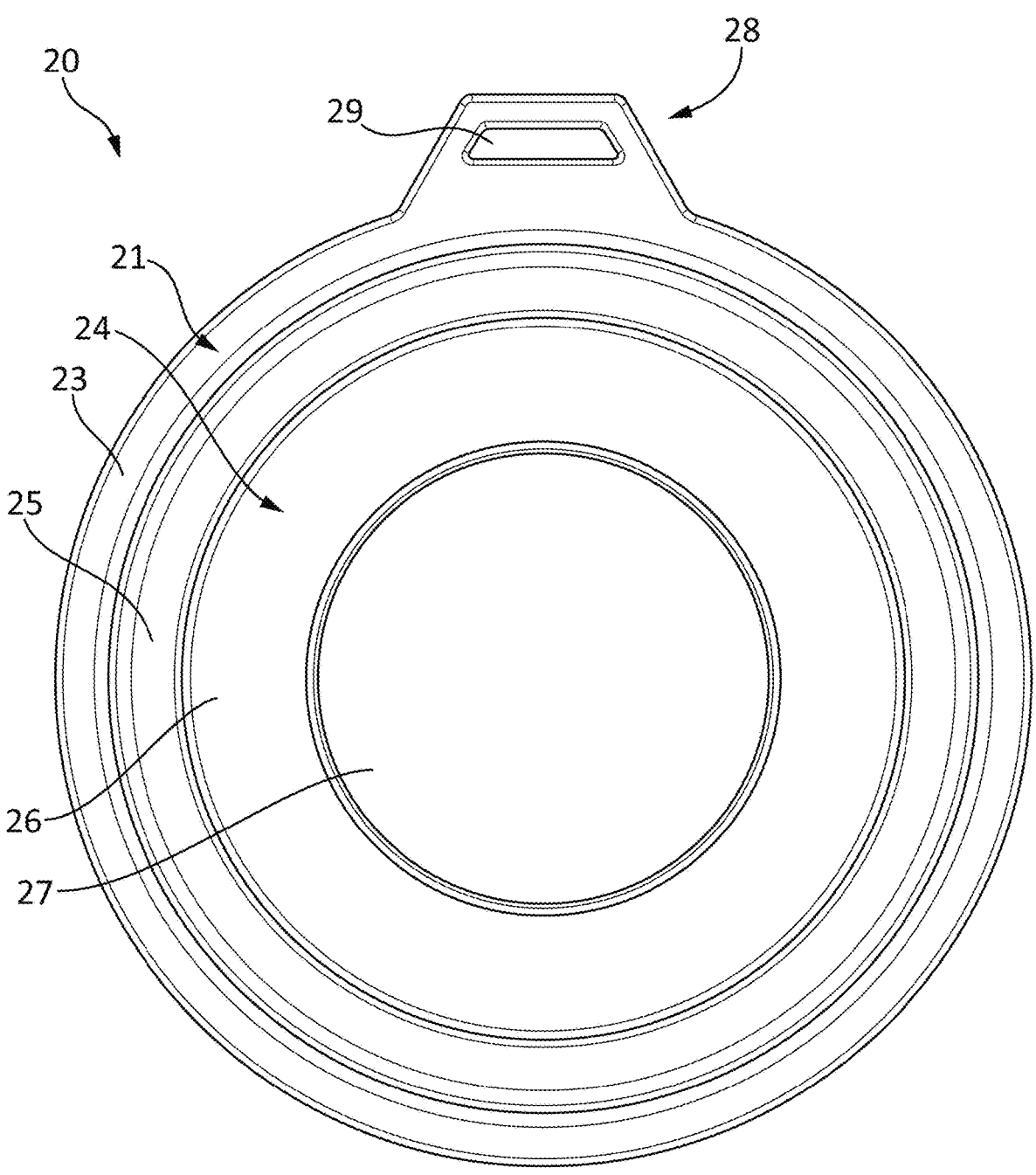
FIG. 16 is a top view of an embodiment of the lid of FIG. 1.
Figure 17:
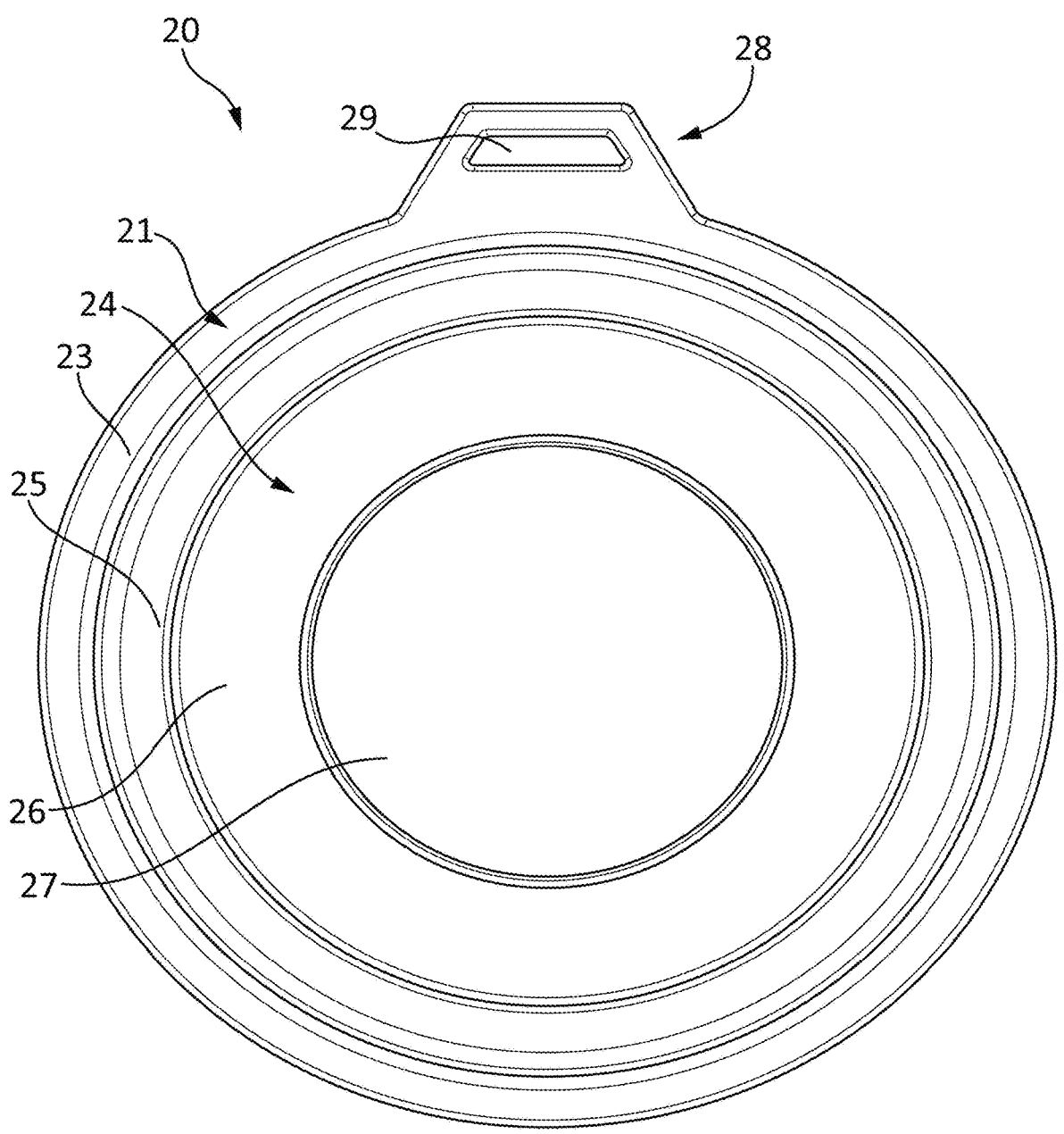
FIG. 17 is a top view of an another embodiment of the lid of FIG. 1.
Figure 18:
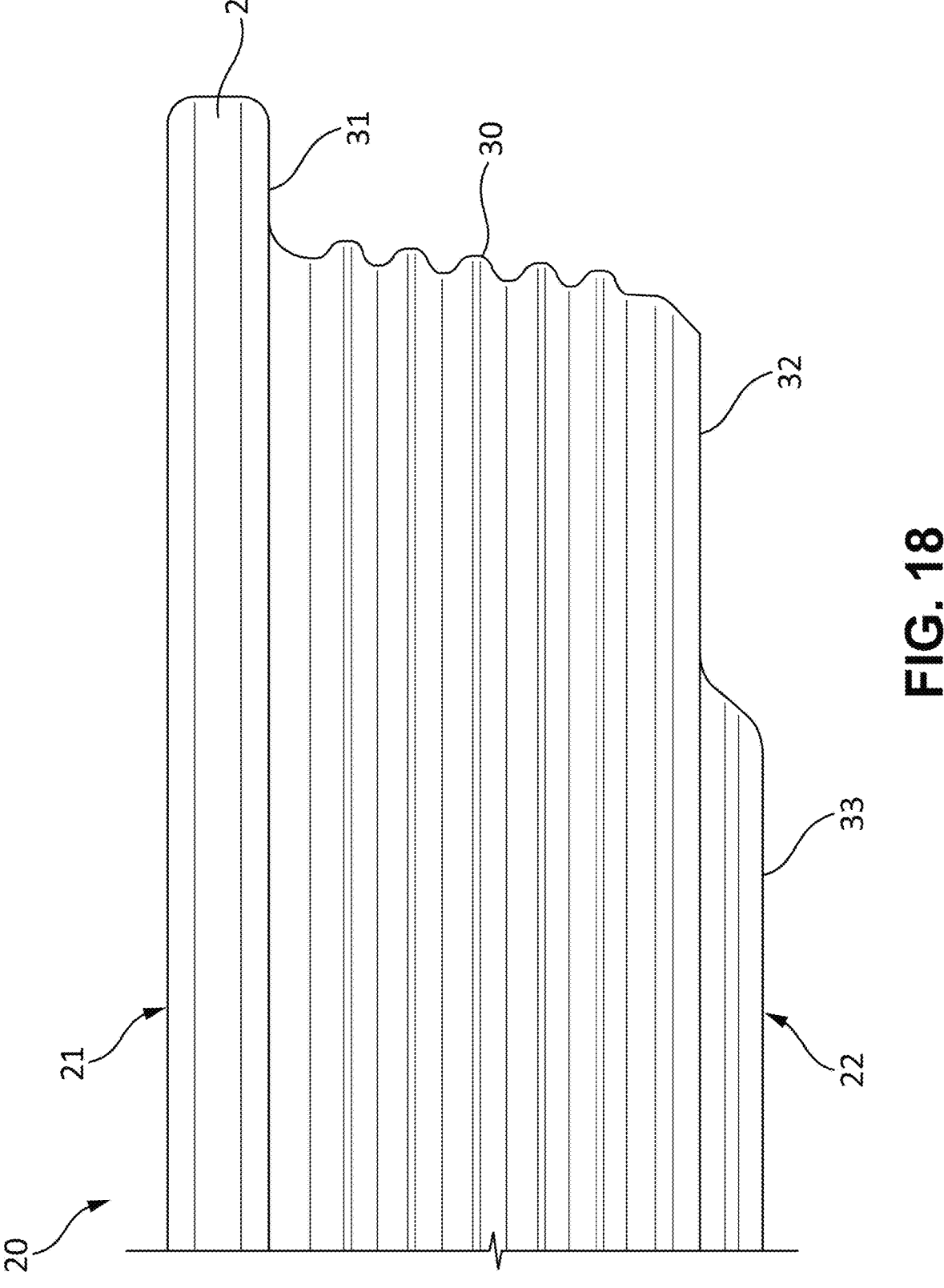
FIG. 18 is a partial side view of an embodiment of the lid of FIG. 1.
Figure 19:
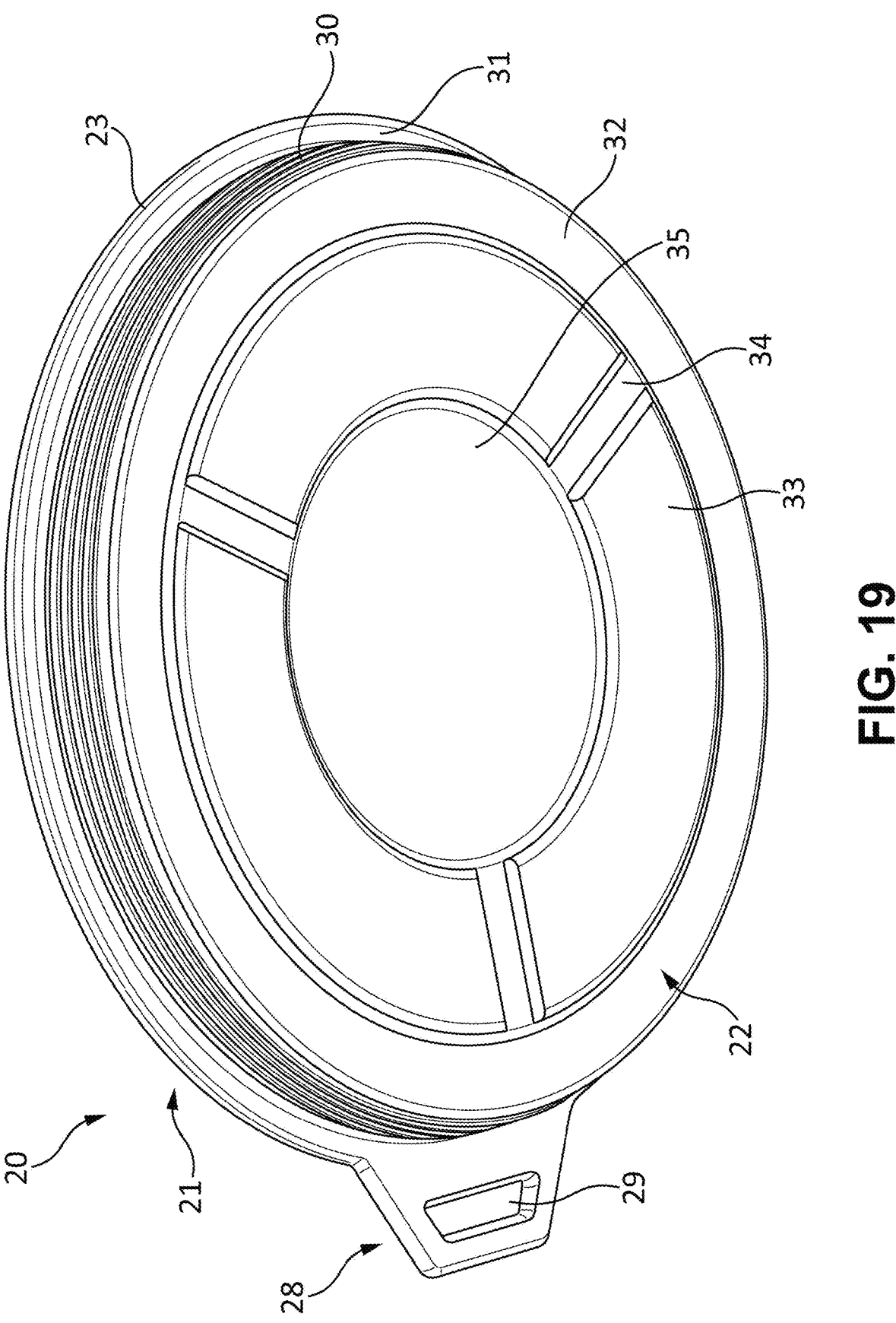
FIG. 19 is a bottom perspective view of an embodiment of the lid of FIG. 1.
Figure 20:
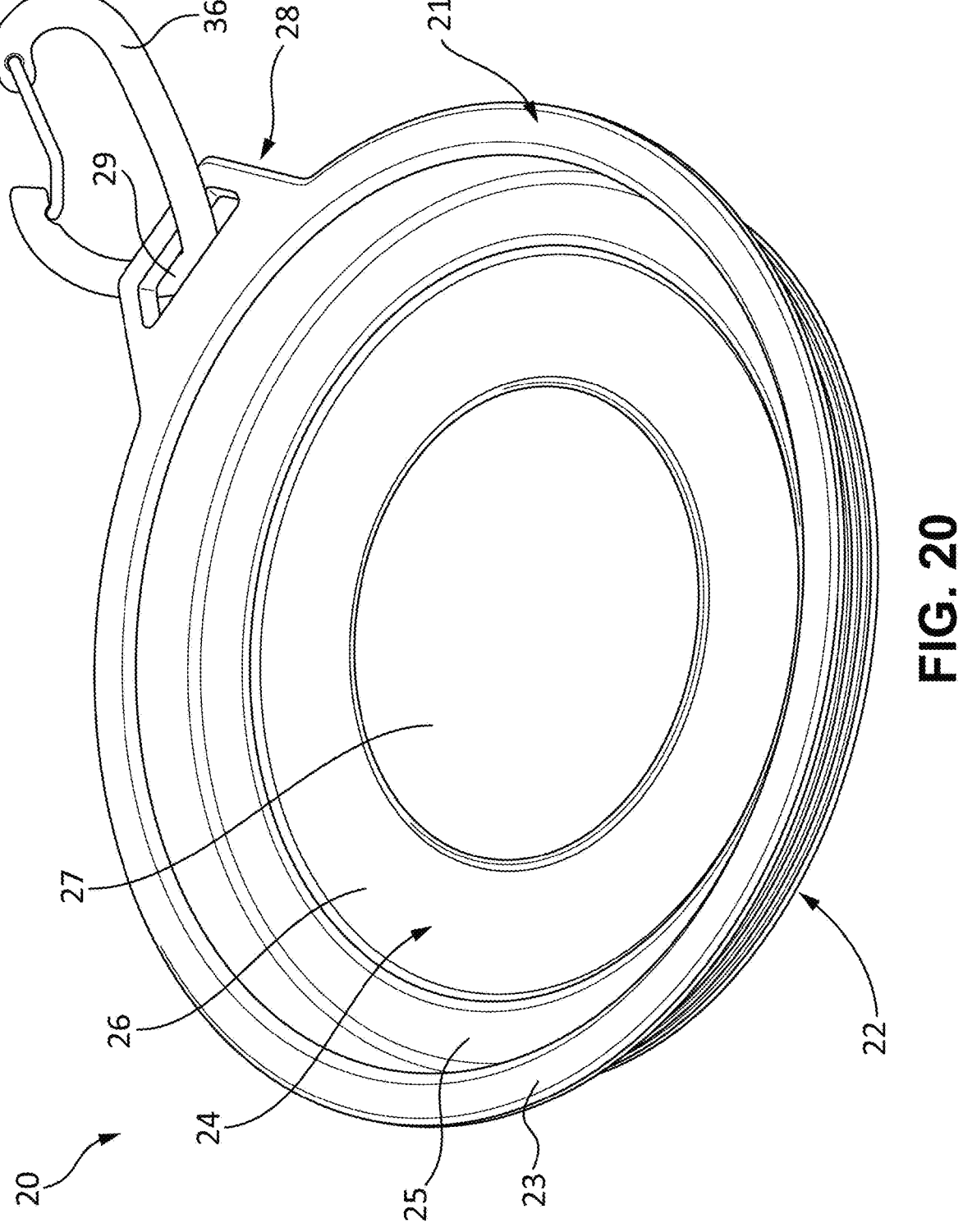
FIG. 20 is perspective view of an embodiment of the lid of FIG. 1 assembled with a carabineer.

Referring now to FIGS. 15-20, the lid 20 is shown in greater detail, according to some embodiments of the present disclosure. FIGS. 15 and 20 depict top perspective views of the lid 20; FIGS. 16-17 depict top views of the lid 20; FIG. 18 depicts a partial side view of the lid 20; and FIG. 19 depicts a bottom perspective view of the lid 20, according to various embodiments. The lid 20 may include a top side 21 a bottom side 22.

The lid 20 may be constructed of any suitable material including, but not limited to, TPR, TPU, or TPE. In this sense, the lid 20 may be made of the same material as the base 60, depending on the implementation of the present disclosure. As mentioned above, the aforementioned materials may provide flexibility. Advantageously, the lid 20 may thus provide a concave or convex bulge when assembled to at the top side 11 of the apparatus 10 (as shown with reference to FIG. 1) in cases where contents of inner region 44 of the bowl 40 produce a vacuum effect or outward pressure (e.g., in case of hot or cold food/water).

In some embodiments, and referring particularly to FIGS. 15-17, the top side 21 of the lid 20 features a concave recess extending between an outer lid lip 23 to an upper lid surface 24 below the outer lid lip 23. The upper lid surface 24 may be defined by an inner lid lip 25, an annular depression 26 below the inner lid lip 25, and a circular projection 27. As discussed in greater detail below with reference to FIGS. 15 and 20, a tab 28 may extend from the outer lid lip 23.

In some embodiments, the circular projection 27 provides an embellished surface on which information (e.g., logos, names, etc.) may be engraved or etched in order to associate the apparatus 10 with a particular animal or owner of the animal. In other embodiments, the circular projection 27 provides a surface on which an information panel may be attached. As a first example, a metal or magnetic plate may be disposed on or within the material of the lid 20 and aligned with the circular projection 27. Such a metal or magnetic plate may be used to secure a magnetic or metal (respectively) information panel to the lid 20. As a second example, an information panel may be secured to the circular projection 27 via a mechanical fastener (e.g., clamp, screws, crimping etc.) or an adhesive.

In some embodiments, and referring particularly to FIGS. 18-19, the lid 20 features ribbing 30, which extends from an annular shelf 31 to the bottom side 22 of the lid 20. For example, the outer lid lip 23 may extend radially outward from the ribbing 30, thereby forming the shelf 31. Thus, the ribbing 30 may be positioned about the circumference of the lid 20.

The bottom side 22 of the lid 20 may include an annular lower lid surface 32, a circular lower lid surface 35 positioned concentrically within the lower lid surface 32, and an annular lid pad 33 extending between the lower lid surface 32 and the lower lid surface 35. As mentioned above, the lid 20 (including the lid pad 33) may be constructed of TPR, TPU, or TPE (as non-limiting examples). As discussed above with reference to FIGS. 11-12 in regards to the base 60, such material may provide a non-slip engagement with a ground surface. Thus, as described in greater detail below with reference to FIGS. 33-35, the lid pad 33 may function as a tactile surface to provide a non-slip engagement for the apparatus 10 with the ground surface when the apparatus 10 is provided with the lid 20 assembled at the bottom side 12 of the apparatus 10.

In some embodiments, the lid pad 33 is annular and form one or more lid gutters 34. For example, the lid pad 33 may feature recesses forming the one or more lid gutters 34 distributed circumferentially about the lid pad 33. As shown, three lid gutters 34 may be distributed as such. When the apparatus 10 is provided with the lid 20 assembled at the bottom side 12 of the apparatus 10 (e.g., when the lid pad 33 is functioning as a tactile surface), the lid gutters 34 may facilitate air channels between the apparatus 10 and the ground surface. For example, such air channels may communicate with regions radially outside the lid pad 33, the region radially within the lower lid surface 35, and with each other. Thus, the lid gutters 34 may prevent the formation of mold, as well as prevent a suction engagement between the apparatus 10 and the ground surface when the apparatus 10 is provided with the lid 20 assembled at the bottom side 12 of the apparatus 10.

As mentioned above, and referring particularly to FIGS. 15 and 20, the lid 20 may include the tab 28 extending radially outward from the lid 20 at the top side 21. In some embodiments, the tab 28 includes a slot 29. In some embodiments, the tab 28 is configured to receive a mechanical fastener within the slot 29. As a first example, such a mechanical fastener may be a carabineer 36 as shown. As a second example, the mechanical fastener may be a strap. while in other embodiments, the apparatus 10 may be coupled to a storage device. In some embodiments, the carabineer 36 may be used to couple the apparatus 10 (or simply the lid 20) to a storage device, such as a rack.

In various embodiments, the carabineer 36 (or other mechanical fastener) is configured to be engaged within another slot 29 of another lid 20 (e.g., in simultaneous addition to the engagement depicted with reference to FIG. 20). Thus, the apparatus 10 may be coupled (via the carabineer 36) to another apparatus 10. In some embodiments, multiple apparatuses 10 are configured to be coupled side-by-side via the carabineer 36 (or some other suitable fastener). In other embodiments, multiple apparatuses 10 are configured to be coupled in a stacked fashion via the carabineer 36 (or a strap, to facilitate the necessary dimensions of the mechanical fastener). For example, as depicted with reference to FIG. 5, more than one bowls 40 may be stacked together. In such cases, one lid 20 may be assembled to the top side 41 of a corresponding bowl 40, while the other lid 20 may be assembled to the bottom side 42 of a corresponding bowl 40. The carabineer 36 or strap may extend between one slot 29 of one lid 20 to the other slot 29 of the other lid 20.

Figure 21:
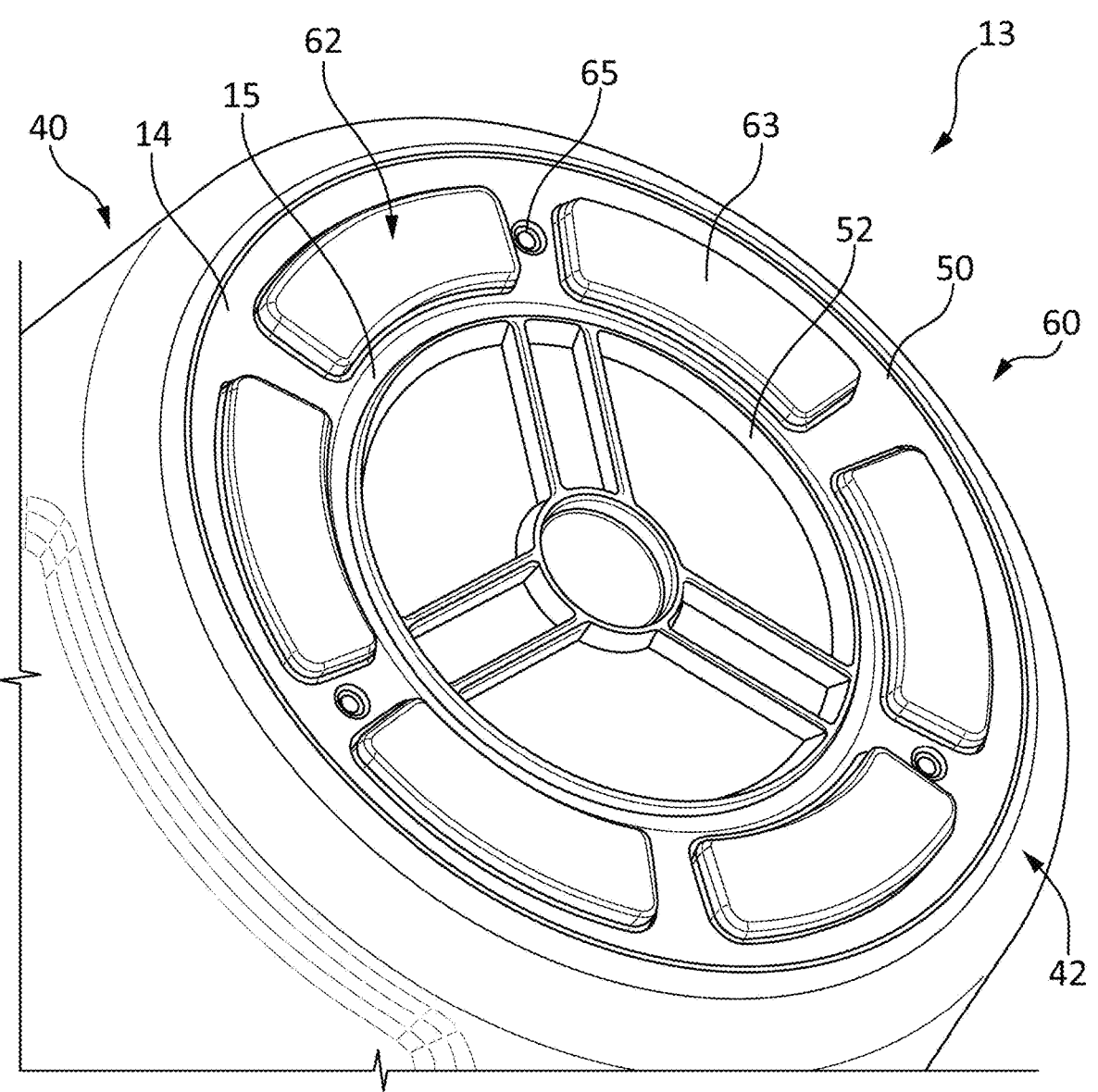
FIG. 21 is a partial bottom perspective view of an embodiment of an assembly of the base of FIG. 1 and the bowl of FIG. 1.
Figure 22:
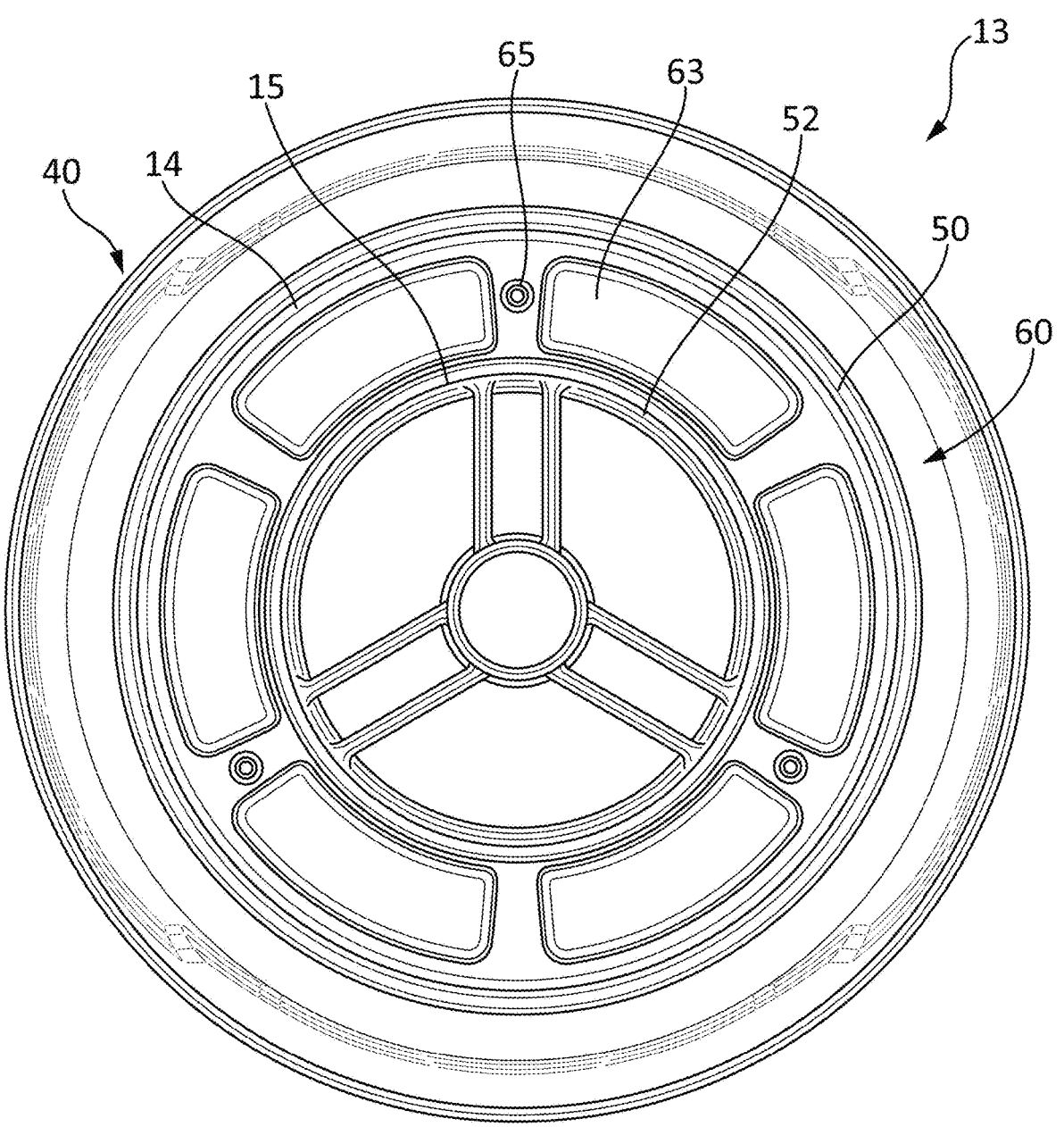
FIG. 22 is a bottom view of an embodiment of an assembly of the base of FIG. 1 and the bowl of FIG. 1.
Figure 23:
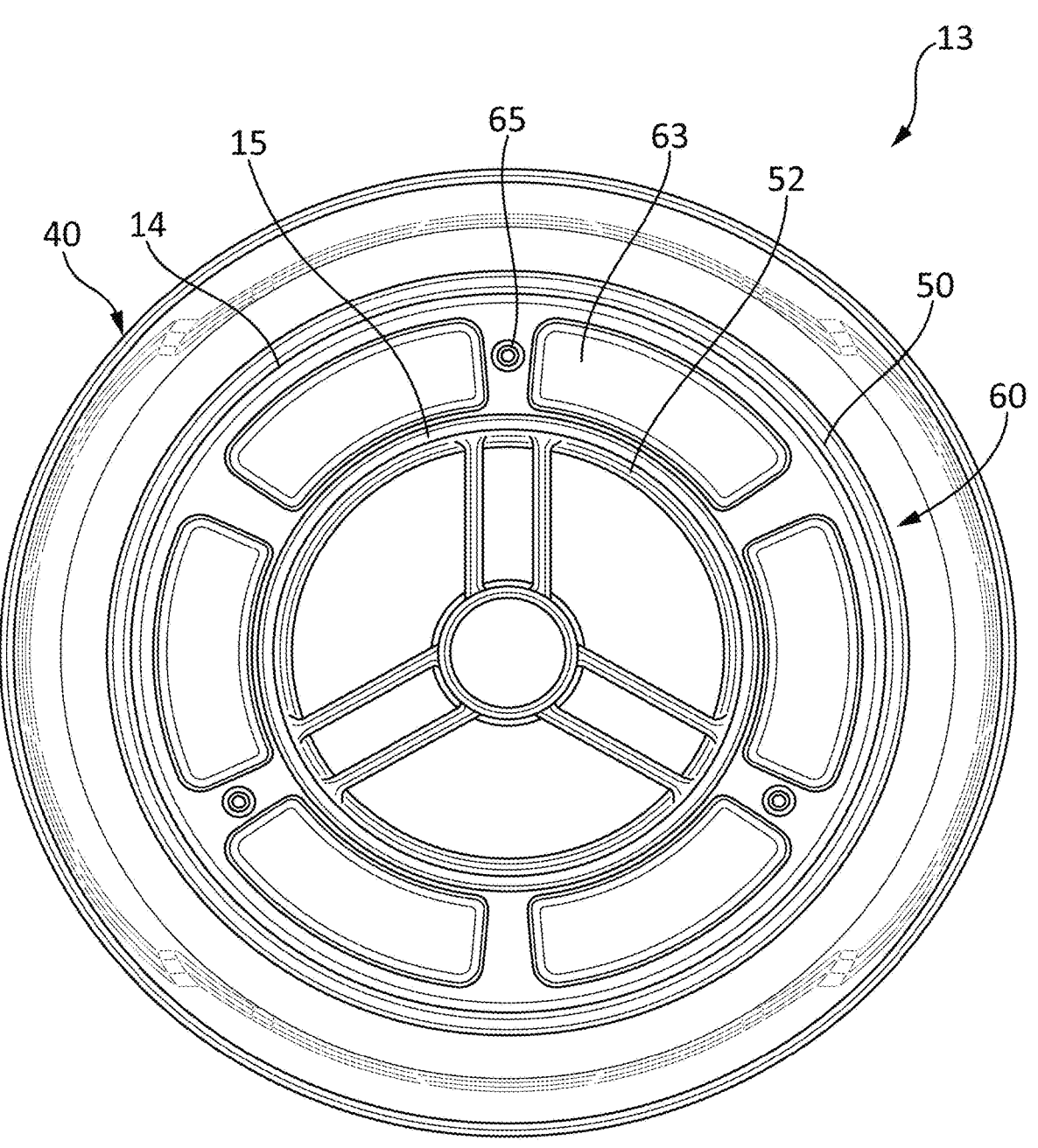
FIG. 23 is a bottom view of an embodiment of an assembly of the base of FIG. 1 and the bowl of FIG. 1.

Referring now to FIGS. 21-23, a first sub-apparatus 13 of the base 60 and the bowl 40 is shown, according to some embodiments of the present disclosure. FIG. 18 depicts a partial bottom perspective view the first sub-apparatus 13, and FIGS. 22-23 depict bottom views the first sub-apparatus 13, according to various embodiments.

In some embodiments, the first sub-apparatus 13 is provided by assembling the base 60 to the bowl 40. In order to assemble the base 60 to the bowl 40, the base 60 may be positioned such that the top side 61 of the base 60 is engaged with the lower bowl surface 51 of the bowl 40 (in other words, such that the bottom side 62 of the base 60 faces away from the bowl 40) and the annular profile of the base body 64 (shown with reference to FIGS. 11-13) is aligned with the profile of the annular lower bowl cavity 57 (e.g., between the outer and inner bowl ridges 50, 52, as shown with reference to FIGS. 7-9).

As depicted with reference to FIGS. 7-9, the lower bowl surface 51 may feature the bosses 54 protruding from the bottom side 42 of the bowl 40. Thus, in order to assemble the base 60 to the bowl 40 in order to provide the first sub-apparatus 13, the base 60 may be further positioned such that the holes 65 of the base 60 are aligned with the bosses 54. For example, the bosses 54 may extend into and/or through the holes 65.

In some embodiments, the engagement between the base 60 and the bowl 40 when provided in the first sub-apparatus 13 is not fixed. In this sense, another component must be provided to secure the base 60 to the bowl 40. As discussed in greater detail below with reference to FIGS. 24-30, the base 60 may be secured to the bowl 40 by the retainer 80. For example, when the base 60 is positioned relative to the bowl 40 as discussed above, an outer gap 14 and an inner gap 15 may be left between the base 60 and the outer and inner bowl ridges 50, 52, respectively. As shown with reference to FIG. 21, the inner gap 15 may be concentrically disposed within the outer gap 14, the outer gap 14 may be concentrically disposed about the base 60 and retainer 80, and the inner gap 15 may be concentrically disposed within the base 60 and the retainer 80.

As discussed in greater detail below with reference to FIGS. 24-30, the outer and inner gaps 14, 15 may receive portions of the retainer 80. In other embodiments, the engagement between the base 60 and the bowl 40 when provided in the first sub-apparatus 13 is fixed. For example, an adhesive may be applied between the top side 61 of the base 60 and the lower bowl surface 51 of the bowl 40 when providing the first sub-apparatus 13 as discussed above. Of course, in such embodiments, the retainer 80 may still be assembled to the first sub-apparatus 13 to further secure the base 60 to the bowl 40.

Figure 24:
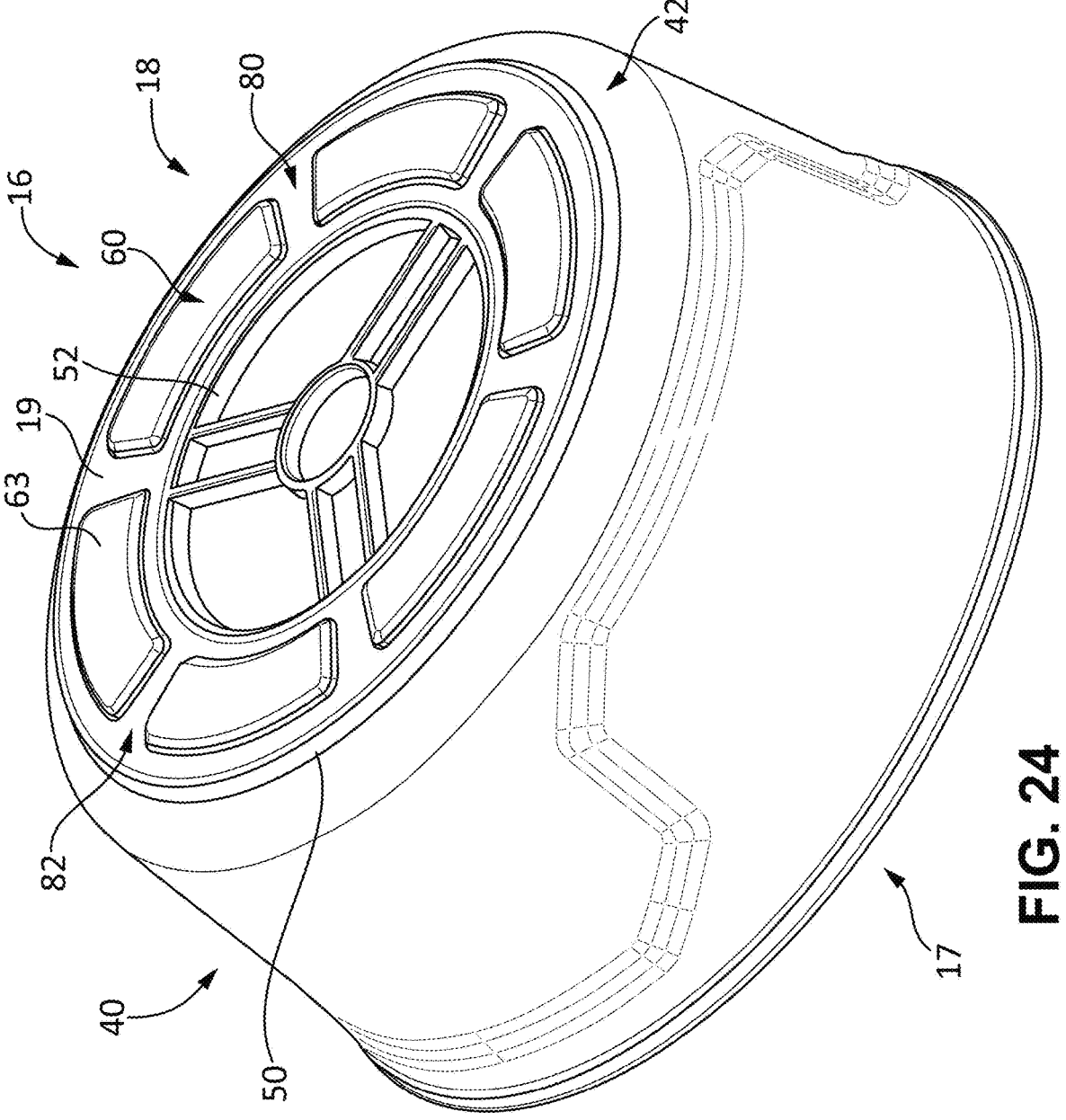
FIG. 24 is a bottom perspective view of an embodiment of an assembly of the retainer of FIG. 1, the base of FIG. 1, and the bowl of FIG. 1.
Figure 25:
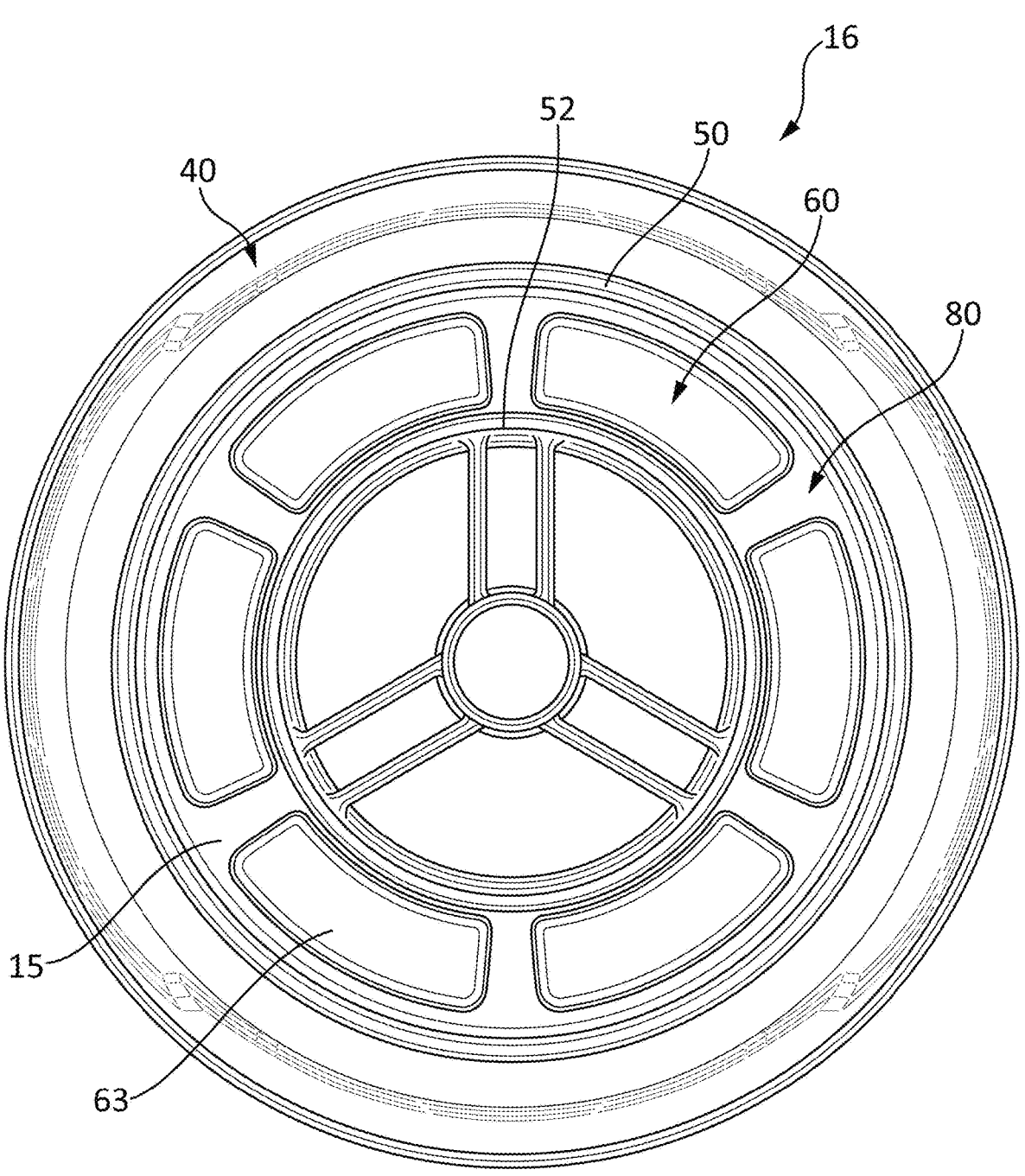
FIG. 25 is a bottom view of an embodiment of an assembly of the retainer of FIG. 1, the base of FIG. 1, and the bowl of FIG. 1.
Figure 26:
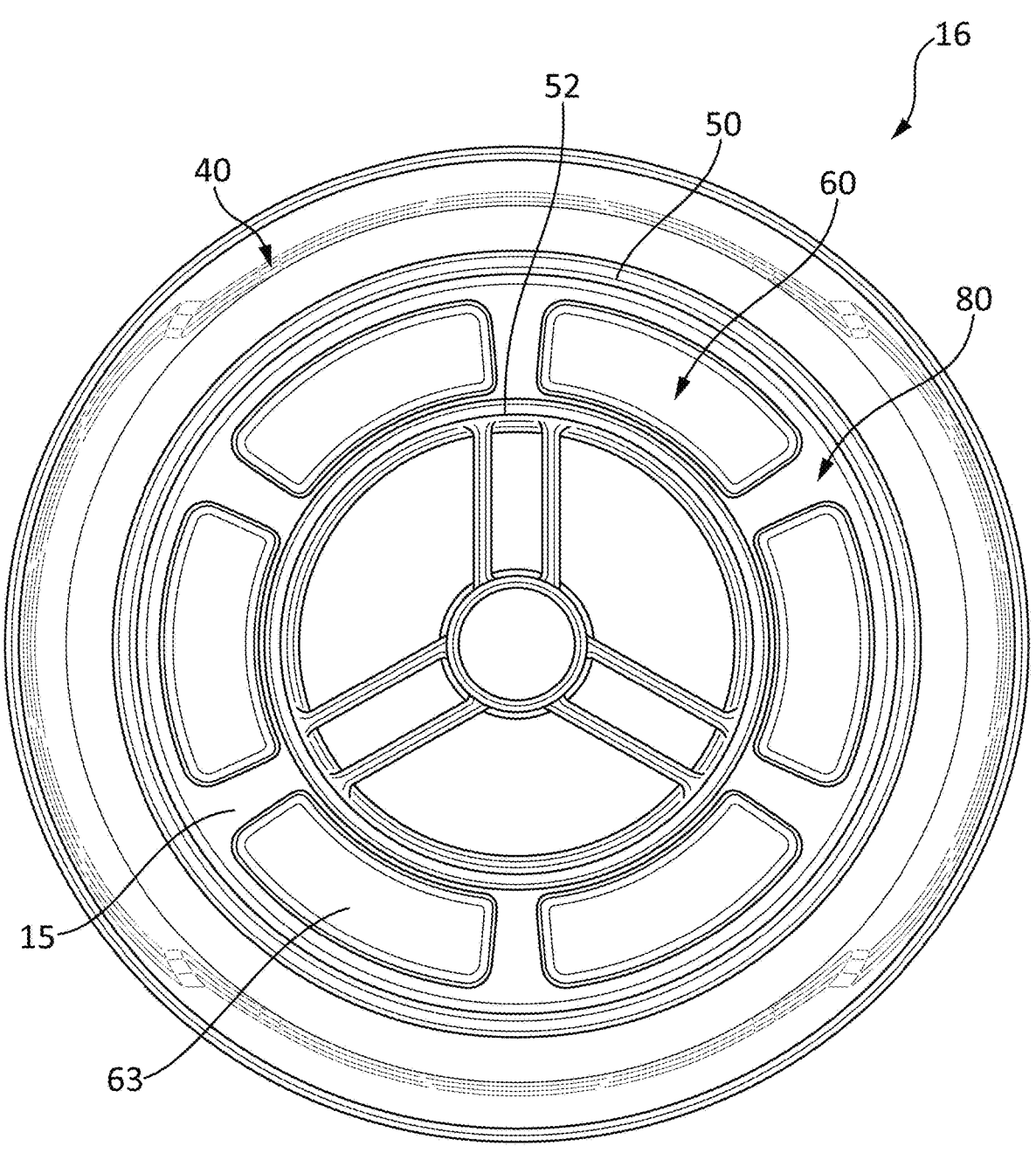
FIG. 26 is a bottom view of an embodiment of an assembly of the retainer of FIG. 1, the base of FIG. 1, and the bowl of FIG. 1.
Figures 27, 29, 30:
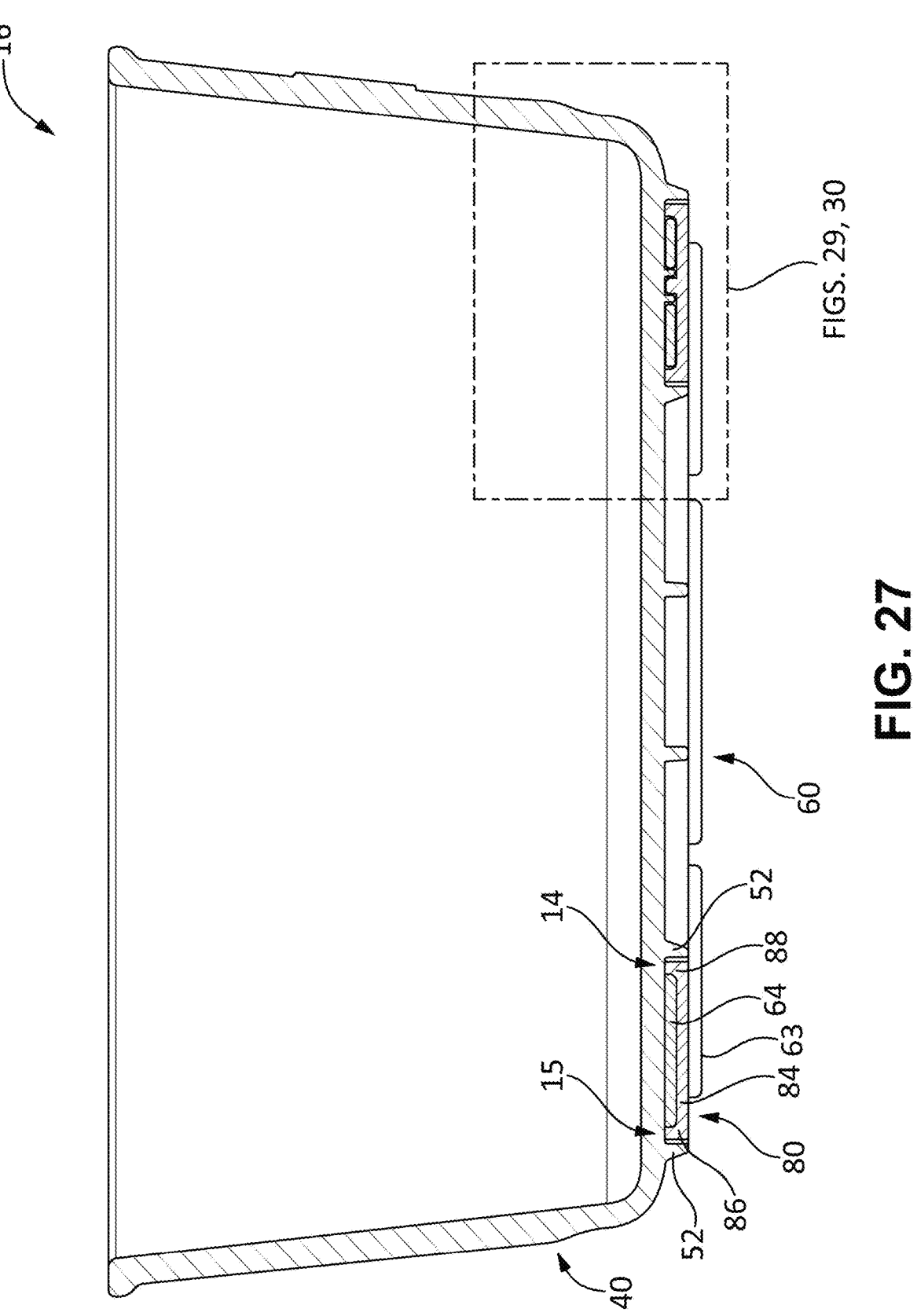
FIG. 27 is a side cross-sectional view of an embodiment of an assembly of the retainer of FIG. 1, the base of FIG. 1, and the bowl of FIG. 1.
FIG. 29 is a partial side cross-sectional view of an embodiment of an assembly of the retainer of FIG. 1, the base of FIG. 1, and the bowl of FIG. 1.
FIG. 30 is a partial side cross-sectional view of an embodiment of an assembly of the retainer of FIG. 1, the base of FIG. 1, and the bowl of FIG. 1.
Figure 28:
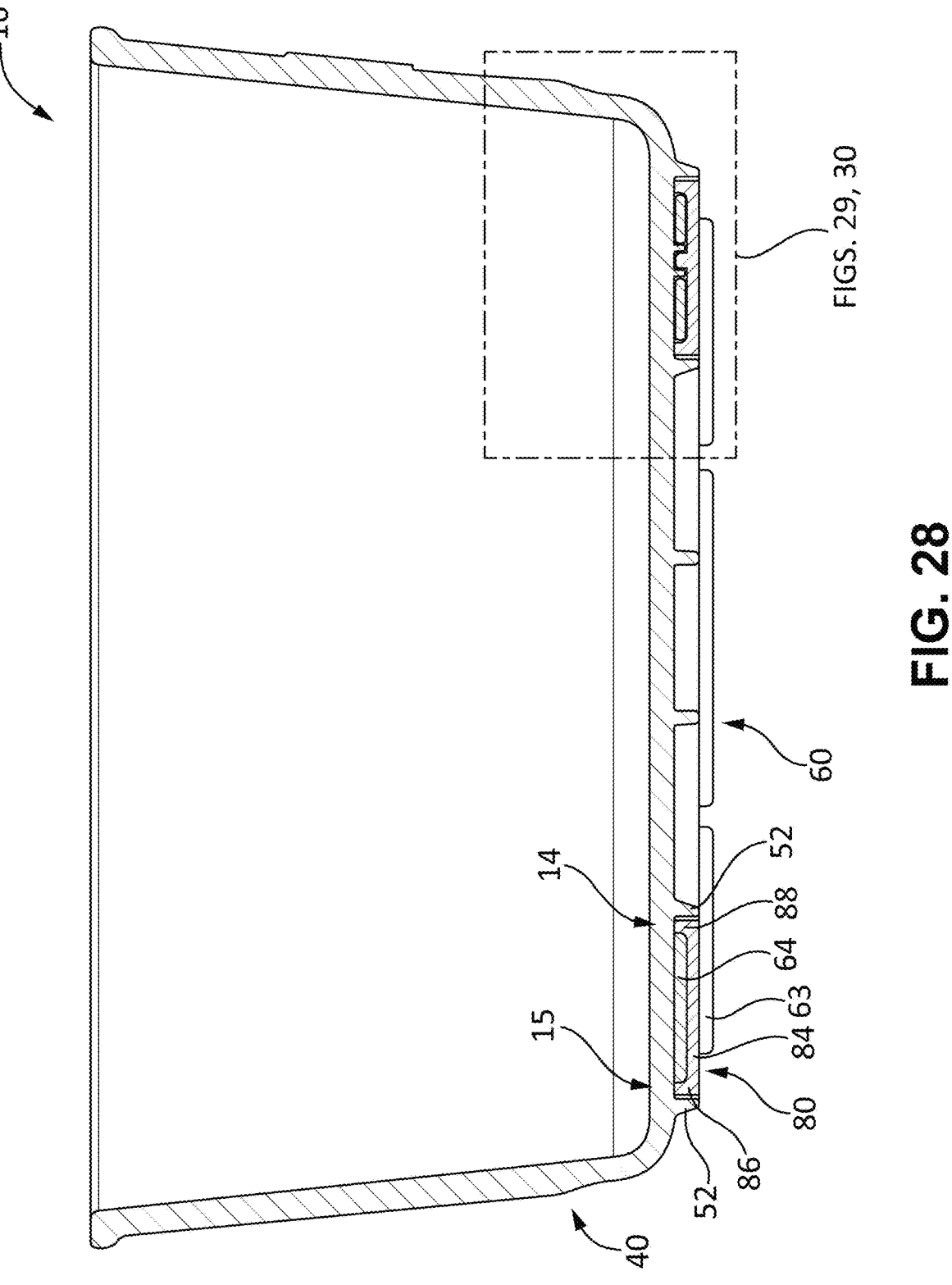
FIG. 28 is a side cross-sectional view of an another embodiment of an assembly of the retainer of FIG. 1, the base of FIG. 1, and the bowl of FIG. 1.
Figure 29:
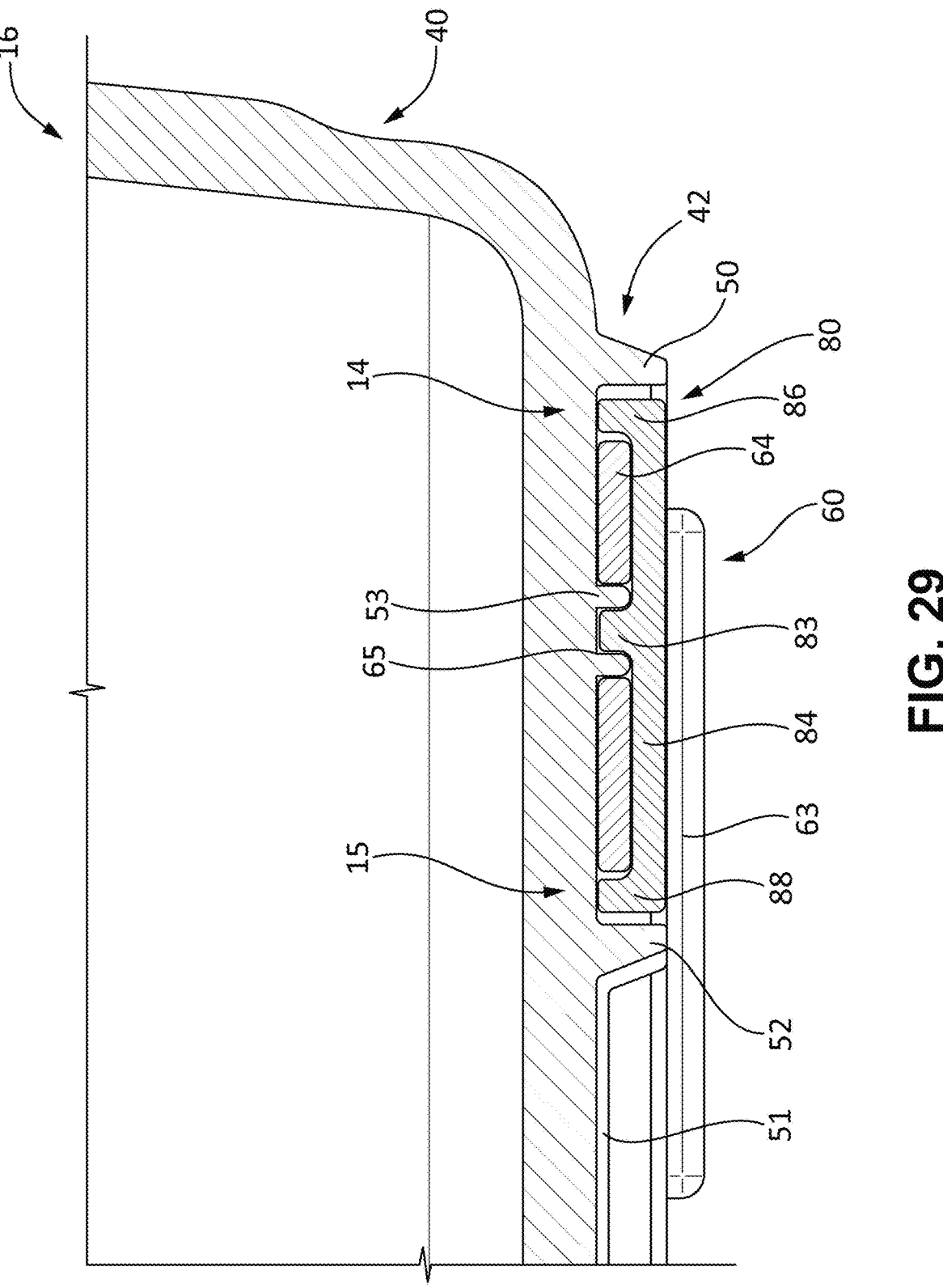
Figure 30:
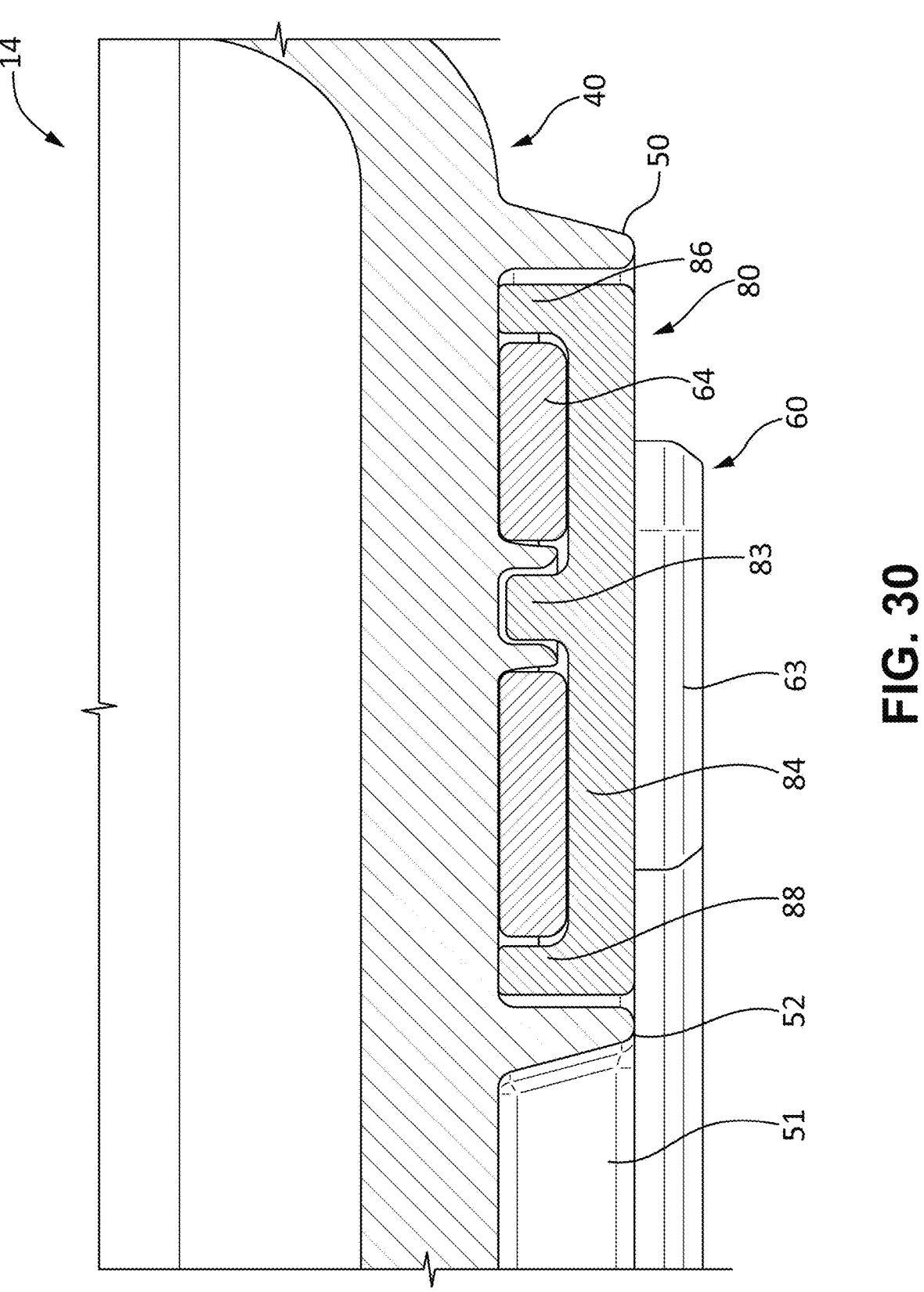

Referring now to FIGS. 24-30, a second sub-apparatus 16 including the retainer 80, the base 60, and the bowl 40 is shown, according to some embodiments of the present disclosure. In other words, the second sub-apparatus 16 may be provided by assembling the retainer 80 to the first sub-apparatus 13 (discussed above with reference to FIGS. 21-24). The second sub-apparatus 16 may include a top side 17 and a bottom side 18. FIG. 24 depicts a bottom perspective view of the second sub-apparatus 16; FIGS. 25-26 depict bottom views of the second sub-apparatus 16; FIGS. 27-28 depict side cross-sectional views of the second sub-apparatus 16; and FIGS. 29-30 depict partial side cross-sectional views of the second sub-apparatus 16, according to various embodiments.

In some embodiments, the second sub-apparatus 16 is provided by first assembling the base 60 to the bowl 40, thereby providing the first sub-apparatus 13 as discussed above with reference to FIGS. 21-23, and then assembling the retainer 80 to the bowl 40 and the base 60 of the first sub-apparatus 13. For example, the retainer 80 may be assembled to and disposed on the bottom side 18 of the second sub-apparatus 16.

In some embodiments, in order to assemble the retainer 80 to the bowl 40 and the base 60, the retainer 80 is positioned such that the top side 81 of the retainer 80 is engaged with the lower bowl surface 51 of the bowl 40 and the bottom side 62 of the base 60 (e.g., such that the bottom side 82 of the retainer 80 faces away from the bowl 40), and the annular profile of the retainer body 84 is aligned with the profile of the annular lower bowl cavity 57 (e.g., between the outer bowl ridge 50 and the inner bowl ridge 52). In other words, the second sub-apparatus 16 may be provided by assembling the retainer 80 to the first sub-apparatus 13, such that he top side 81 of the retainer 80 is disposed on the bottom side 42 of the bowl 40. Thus, the bowl 40 may include the outer bowl ridge 50 and the inner bowl ridge 52 protruding from the bottom side 42 of the bowl, and the base 40 and the retainer 80 may be radially positioned between the outer bowl ridge 50 and the inner bowl ridge 52.

As mentioned above with reference to FIGS. 18-20, when the base 60 is positioned relative to the bowl 40 in order to provide the first sub-apparatus 13, the outer and inner gaps 14, 15 may be left between the base 60 and the outer and inner bowl ridges 50, 52, respectively. Accordingly, when the retainer 80 is positioned relative to the bowl 40 and the base 60 at the bottom side 18 of the sub-apparatus 16 in order to provide the second sub-apparatus 16, the outer and inner retainer ridges 86, 88 may be located within the outer and inner gaps 14, 15, respectively.

In various embodiments, and as depicted with reference to FIGS. 9-11 and 11-14, the bowl 40 includes the bosses 54 extending from the bottom side 42 of the bowl 40; the base 60 includes the holes 65 extending through the base body 64; and the retainer 80 includes the pins 83. As discussed above with reference to FIGS. 21-23, the first sub-apparatus 13 may be provided by aligning the holes 65 of the base 60 with the bosses 54 of the bowl 40, such that the bosses 54 extend into and/or through the holes 65. In turn, and referring particularly to FIGS. 27-30, in order to assemble the retainer 80 to the base 60 and the bowl 40 in order to provide the second sub-apparatus 16, the retainer 80 may be further positioned such that the pins 83 of the retainer 80 are aligned with the bosses 54, as well as the holes 60. For example, the pins 83 may extend through the holes 65 and into (e.g., engage) the bosses 54. In this sense, the bosses 54 may define guide holes through which the pins 83 may extend.

In some embodiments, and continuing to refer particularly to FIGS. 27-30, once the retainer 80 is assembled to the first sub-apparatus 13 as discussed above, the retainer 80 may be attached (e.g., coupled, connected, fixed, etc.) to the first sub-apparatus 13 in order to secure the base 60 to the bowl 40 (e.g., clamping or "sandwiching" the base 60 to the bowl 40). In some embodiments, the retainer 80 is attached to the first sub-apparatus 13 by welding the retainer 80 to the bowl 40. For example, the retainer 80 may be fixedly attached by performing sonic welding (e.g., sonic bonding) between the retainer 80 and the bowl 40, which is a process in which high-frequency (ultrasonic) sound waves are applied to two or more pieces (e.g., the retainer 80 and the bowl 40) that are being held together under pressure in order to fuse them into a single component.

In some embodiments, while positioned relative to the base 60 and the bowl 40 of the first sub-apparatus 13 as discussed above, the retainer 80 is attached (e.g., welded, sonic or otherwise) to the annular lower bowl cavity 57 (e.g., between the outer bowl ridge 50 and the inner bowl ridge 52). As a first example, the retainer 80 may be attached to the bowl 40 along the outer retainer ridge 86 of the retainer 80. In this sense, the material of the retainer 80 at the outer retainer ridge 86 may be bonded with the material of the bowl 40 at the outer gap 14 (shown with reference to FIGS. 21-23). As a second example, the retainer 80 may be attached to the bowl 40 along the inner retainer ridge 88 of the retainer 80. In this sense, the material of the retainer 80 at the inner ridge 88 may be bonded with the material of the bowl 40 at the inner gap 16 (shown with reference to FIGS. 21-23). In the aforementioned examples, the outer and inner bowl ridges 50, 52 may additionally function as barriers to contain any by-products of the attachment (e.g., welding) process, such as material of the bowl 40 at the outer and inner gaps 14, 15 and/or material of the retainer 80 at the outer and inner ridges 86, 88 within the annular lower bowl cavity 57. As a third example, the retainer 80 may be attached to the bowl 40 at the pins 83 of the retainer 80. In this sense, the material of the pins 83 may be bonded to the material of the bosses 54 of the bowl 40.

Of course, when the retainer 80 is attached to the bowl 40 of the first sub-apparatus 13 as discussed above, portions of the base 60 (e.g., portions of the base body 64 about the spaces 66 of the base 60) may be retained between the bowl 40 and the retainer 80. Accordingly, the retainer 80 may secure the base 60 to the bottom side 42 of the bowl 40 in order to provide the second sub-apparatus 16.

As discussed above, the base 60 is secured to the bottom side 42 of the bowl 40 by the retainer 80, according to some embodiments. For instance, the top side 81 of the retainer 80 may be disposed on the bottom side 42 of the bowl 40. In other words, the base 60 may be positioned between the retainer 80 and the bowl 40 such that the top side 61 of the base 60 is disposed on the bottom side 42 of the bowl 40 and the bottom side 62 of the base 60 is disposed on the top side 81 of the retainer 80.

As mentioned above with reference to FIGS. 11-14, the base pads 63 of the base 60 may extend from the base body 64 of the base 60, thereby defining the spaces 66 between the base pads 63. Similarly, the openings 85 may extend through the retainer body 84, thereby defining the spaces 87 between the openings 85. Further, the openings 85 may be shaped to receive the base pads 63 of the base 60 when the retainer 80 is used to secure the base 60 to the bowl 40. Thus, and as shown with particular reference to FIG. 24, when the retainer 80 secures the base 60 to the bowl 40 in order to provide the second sub-apparatus 16, the base pads 63 may be aligned with and extend through the openings 85, while the spaces 66 defined by the base body 64 of the base 60 may be aligned with and engaged (in a flush fashion, for example) with the spaces 87 defined by the retainer body 84 of the retainer 80.

Referring particularly to FIGS. 24-26, when the retainer 80 is used to secure the base 60 to bowl 40 to provide the second sub-apparatus 16, the base pads 63 may project at least slightly past the bottom side 82 of the retainer 80. Accordingly, the base pads 63 may provide a non-slip engagement with a ground surface when the apparatus 10 is assembled as shown with reference to FIG. 1 and positioned such that the bottom side 12 of the apparatus 10 is placed on the ground surface (or, in cases where the lid 20 is not assembled to the bowl 40, when the second sub-apparatus 16 is positioned such that the bottom side 18 is placed on the ground surface).

In some embodiments, one or more base gutters 19 are defined between the base pads 63, due to the slight extension of the base pads 63 past the bottom side 82 of the retainer 80. For example, the base pads 63 may be distributed circumferentially around the base 60, and the base pads 63 and the bottom side 82 of the retainer 80 may form one or more base gutters 19. In this sense, when the bottom side 12 of the apparatus 10 (or the bottom side 18 of the second sub-apparatus 16) is placed on the ground surface, the base gutters 19 may facilitate one or more air channels between the apparatus 10 (or the second sub-apparatus 16).

In some embodiments, when the base pads 63 are engaged with the ground surface, the one or more air channels provided by the base gutters 19 are in communication with the region radially outside the base pads 63, a region located radially within the circular lower bowl cavity 58, and each other. Due to the communication among the air channels formed by the base gutters 19, the base gutters 19 may prevent the formation of mold in between the apparatus 10 (or the second sub-apparatus 16) and the ground surface when the base pads 63 are engaged with the ground surface. Furthermore, the base gutters 19 may prevent suction from being formed between the apparatus 10 (or the second sub-apparatus 16) and the ground surface when the base pads 63 are engaged with the ground surface.

In various embodiments, the apparatus 10 is provided by assembling the lid 20 to the second sub-apparatus 16. As a first example, and as shown with reference to FIGS. 1 and 31-32, the lid 20 may be assembled at the top side 41 of the bowl 40 in order to provide the apparatus 10. In other words, the lid 20 may be provided on the top side 11 of the apparatus 10. As a second example, and as shown with reference to FIGS. 33-35, the lid 20 may be assembled to the bottom side 42 of the bowl 40 in order to provide the apparatus 10. In other words, the lid 20 may be provided on the bottom side 12 of the apparatus 10.

Figure 31:
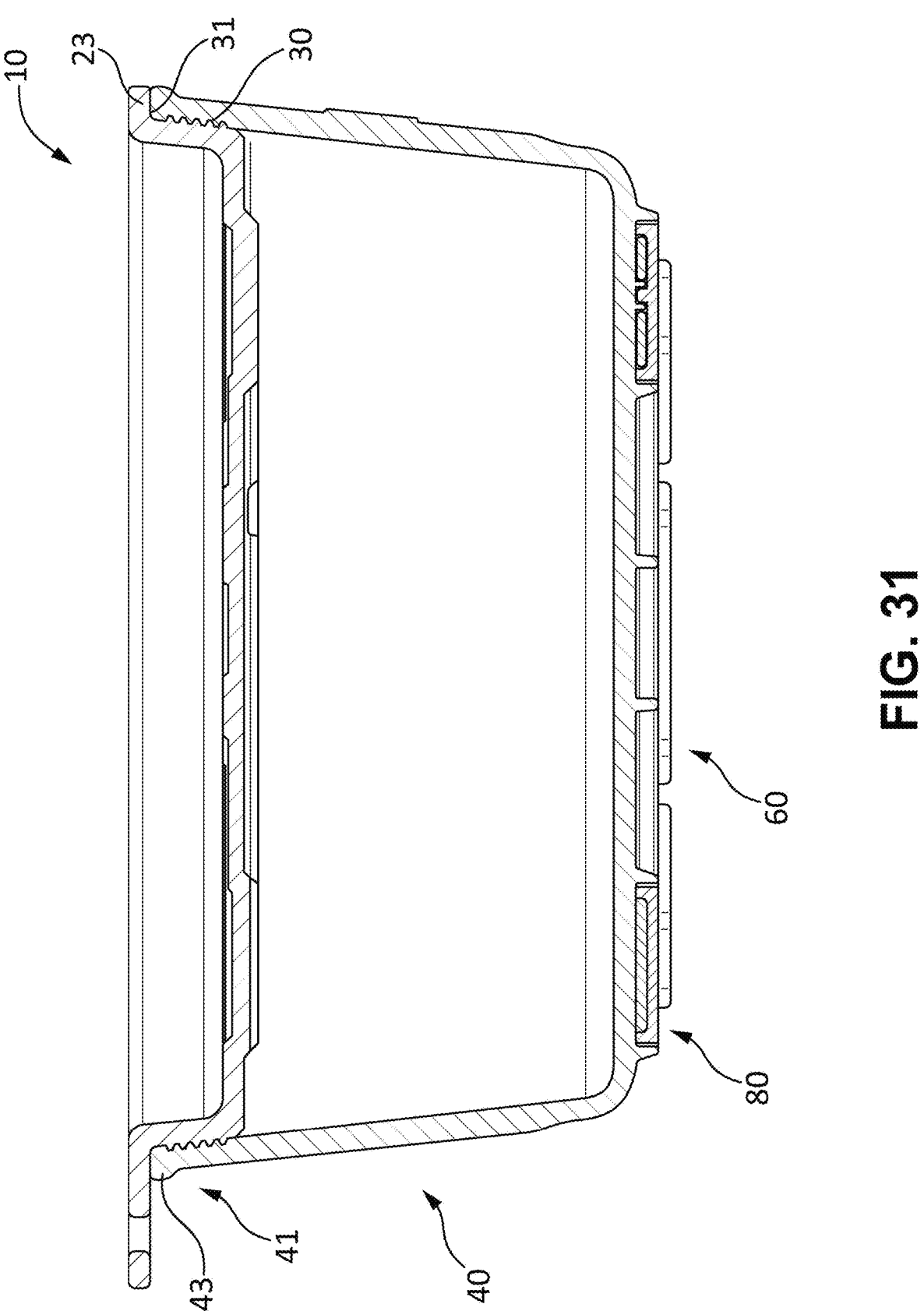
FIG. 31 is a side cross-sectional view of an embodiment of the apparatus of FIG. 1.
Figure 32:
FIG. 32 is a side cross-sectional view of an embodiment of the apparatus of FIG. 1.

Referring now to FIGS. 31-32, the apparatus 10 is shown, according to some embodiments of the present disclosure. FIGS. 31-32 depict side cross-sectional views of the apparatus 10, according to various embodiments. As discussed above, the apparatus 10 may be provided by assembling the lid 20 to the second sub-apparatus 16 (e.g., the bowl 40, the base 60, and the retainer 80), such that the lid 20 is provided at the top side 11 of the apparatus 10. As shown, the lid 20 may be assembled to the second sub-apparatus 16 by securing the lid 20 to the top side 41 of the bowl 40. For example, and as depicted with reference to FIGS. 18-19, the lid 20 may feature the ribbing 30. For example, the lid 20 may be positioned within the bowl 40 such that shelf 31 of the lid 20 is engaged with the upper bowl lip 43 of the bowl 40. Further, the ribbing 30 of the lid 20 may engage the inner bowl surface 55 of the bowl 40 when the lid 20 is disposed on the top side 41 of the bowl 40. In other words, due to the ribbing 30, a portion of the lid 20 below the shelf 31 of the lid 20 may be "wedged" into the inner region 44 of the bowl 40, thereby creating a seal.

Referring now to FIGS. 33-35, an alternative arrangement of the apparatus 10 is shown, according to some embodiments of the present disclosure. FIG. 33 depicts a bottom perspective view of the apparatus 10 with the lid 20 assembled to the bottom side 18 of the second sub-apparatus 16 (depicted with reference to FIGS. 24-30), and FIGS. 34-35 depict side cross-sectional views of the apparatus 10 with the lid 20 assembled to the bottom side 16 of the second sub-apparatus 16, according to various embodiments. As discussed above, the apparatus 10 may be provided by assembling the lid 20 to the second sub-apparatus 16 (e.g., the bowl 40, the base 60, and the retainer 80), such that the lid 20 is provided at the bottom side 12 of the apparatus 10. In this sense, the lid 20 may be configured to be disposed on the top side 41 of the bowl 40 or disposed on the bottom side 82 of the retainer 80.

As discussed above with reference to FIGS. 3-8, 11-12, and 15-17, the lid 20 may define the outer lid lip 23, the inner lid lip 25, the depression 26, and the projection 27; the bowl 40 may define the crease 59 defined between the ramp 48 and the lower bowl lip 49, the outer bowl ridge 50, the spokes 53, and the inner bowl ridge 52; and the base 60 may define the base pads 63. In some embodiments, when the lid 20 is assembled to the bottom side 18 of the second sub-apparatus 16, the lid 20 may be engaged with the bottom side 18 of the second sub-apparatus 16, such that the second sub-apparatus 16 is seated within the lid 20, or the lid 20 is removably secured to the second sub-apparatus 16, thereby providing an alternative arrangement of the apparatus 10 as shown. As a first example, the outer lid lip 23 of the lid 20 may engage the crease 59 defined between the ramp 48 of the bowl 40 and the lower bowl lip 49 of the bowl 40. As a second example, the inner lid lip 25 of the lid 20 may engage the outer bowl ridge 50 of the bowl 40. As a third example, the depression 26 of the lid 20 may engage, or leave a cavity for, the base pads 63. As a fourth example, the projection 27 may engage the inner bowl ridge 52 of the bowl 40 and/or the spokes 53 of the bowl 40.

As discussed above with reference to FIG. 19, the lid 20 may define the lid pad 33, which may function as a tactile surface and define the lid gutters 34. For example, the lid 20 may further include the lid pad 33 protruding from the bottom side 22 of the lid 20. Thus, when the apparatus 10 is provided in the alternative arrangement shown, the lid pad 33 may provide a non-slip engagement with the ground surface, while the lid gutters 34 prevent the formation of mold under the apparatus 10 or suction with the ground surface.

Accordingly, as described herein, the present disclosure may provide for the apparatus 10. In an exemplary embodiment of the present disclosure, the apparatus 10 may include the bowl 40, the retainer 80, the base 60, and the lid 20. The bowl 40 may include including the top side 41, the bottom side 42, and the bosses 54 protruding from the bottom side 42 of the bowl 40. The retainer 80 may include the top side 81, the bottom side 82, the openings 85, and the pins 83 protruding from the top side 81 of the retainer 80. The lid 20 may include the top side 21 and the bottom side 22. The lid 20 may be configured to be disposed on the top side 41 of the bowl 40 or the bottom side 82 of the retainer 80. The top side 81 of the retainer 80 may be disposed on the bottom side 42 of the bowl 40. The base 60 may include the top side 61, the bottom side 62, the pads 63 protruding from the bottom side 62 of the base 60, and the holes 65. The base 60 may be positioned between the retainer 80 and the bowl 40 such that the top side 61 of the base 60 is disposed on the bottom side 42 of the bowl 40 and the bottom side 62 of the base 60 is disposed on the top side 81 of the retainer 80. The base pads 63 may extend through the openings 85, the bosses 54 may extend through the holes 65, and the pins 83 may extend through the holes 65 and engage the bosses 54.

Further, as described herein, the present disclosure may provide for a method of providing the apparatus 10. The method may include providing the bowl 40 and the base 60; positioning the base 60 relative to the bowl 40 such that the top side 61 of the base 60 is engaged with the bottom side 42 of the bowl 40 and the bosses 54 of the bowl 40 extend through the holes 65 of the base 60; providing the retainer 80; and attaching the retainer 80 to the bowl 40 such that the top side 81 of the retainer 80 is engaged with the bottom side 42 of the bowl 40, the base pads 63 of the base 60 extend through the openings 85 of the retainer 80, the pins 83 of the retainer 80 are engaged with the bosses 54, and the base 60 is secured to the bowl 40. In some embodiments, the method further includes providing the lid 20, which may be configured to be engaged with the top side 41 of the bowl 40 or the bottom side 82 of the retainer 80.

Figure 36:
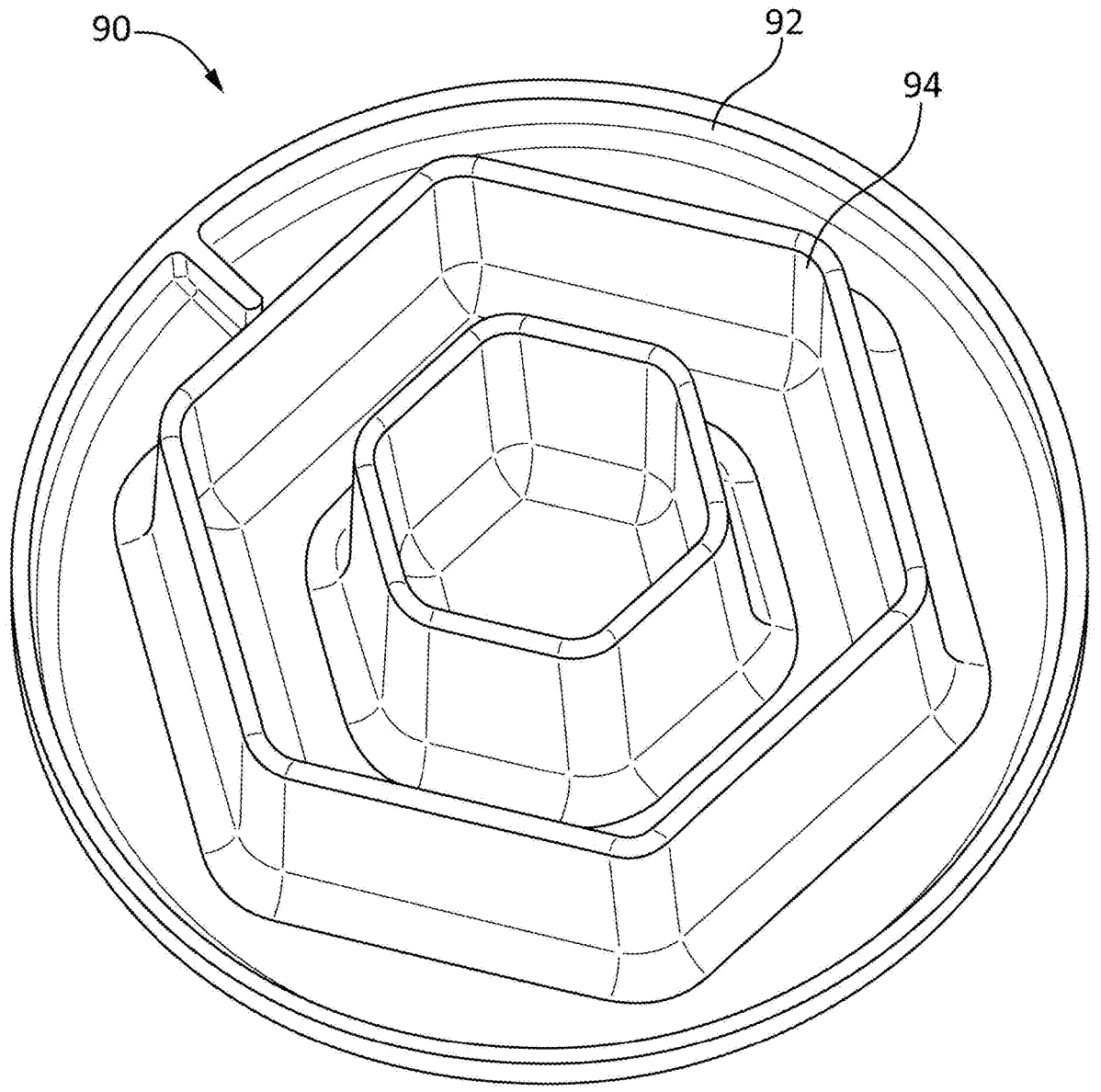
FIG. 36 is a top perspective view of an embodiment of a maze plate accessory configured for assembly to a bottom of the apparatus of FIG. 1.

Referring now to FIG. 36, a maze plate 90 is shown, according to some embodiments of the present disclosure. In some embodiments, the maze plate 90 is configured to be assembled to the bottom side 12 of the apparatus 10. The maze plate 90 may include ridges 94 that encourage an animal to eat foot slowly, and an outer maze plate lip 92 that is configured to engage either the top side 41 of the bowl 40, or the bottom side 18 of the sub-apparatus 16 (described with reference to FIGS. 24-30). Thus, in various embodiments, the apparatus 10 may further include the maze plate 90.

In the drawings, not all reference numbers are included in each drawing, for the sake of clarity. In addition, positional terms such as "upper," "lower," "side," "top," "bottom," etc. refer to the apparatus when in the orientation shown in the drawing. A person of skill in the art will recognize that the apparatus can assume different orientations when in use.

Thus, although there have been described particular embodiments of the present invention of a new and useful BOWL, it is not intended that such references be construed as limitations upon the scope of this invention.

What is claimed is:
1. An apparatus comprising:
a bowl including a top side, a bottom side, and one or more bosses protruding from the bottom side of the bowl;
a retainer including a top side, a bottom side, one or more openings, and one or more pins protruding from the top side of the retainer, the top side of the retainer disposed on the bottom side of the bowl; and
a base including a top side, a bottom side, one or more base pads protruding from the bottom side of the base, and one or more holes, the base positioned between the retainer and the bowl such that the top side of the base is disposed on the bottom side of the bowl and the bottom side of the base is disposed on the top side of the retainer, wherein the base pads extend through the openings, the bosses extend through the holes, and the pins extend through the holes and engage the bosses.

2. The apparatus of claim 1, further comprising a lid including a top side and a bottom side, wherein the lid is configured to either be disposed on the top side of the bowl or disposed on the bottom side of the retainer.

3. The apparatus of claim 2, wherein the lid further includes ribbing, and the ribbing engages an inner bowl surface of the bowl when the lid is disposed on the top side of the bowl.

4. The apparatus of claim 2, wherein the lid further includes a lid pad protruding from the bottom side of the lid.

5. The apparatus of claim 4, wherein the lid pad is annular and forms one or more lid gutters.

6. The apparatus of claim 1, wherein the base pads are distributed circumferentially about the base, and the base pads and the bottom side of the retainer form one or more base gutters.

7. The apparatus of claim 1, wherein the bowl further includes an outer bowl ridge and an inner bowl ridge protruding from the bottom side of the bowl, and the base and the retainer are radially positioned between the outer bowl ridge and the inner bowl ridge.

8. An apparatus, comprising:

a bowl including a top side and a bottom side;

a retainer including a top side, a bottom side, and one or more openings, the top side of the retainer disposed on the bottom side of the bowl;

a base including a top side, a bottom side, and one or more base pads protruding from the bottom side of the base, the base positioned between the retainer and the bowl such that the top side of the base is disposed on the bottom side of the bowl and the bottom side of the base is disposed on the top side of the retainer; and a lid including a top side and a bottom side, the lid configured to either be disposed on the top side of the bowl or disposed on the bottom side of the retainer, wherein the base pads extend through the openings, and wherein the bowl further includes an outer bowl ridge and an inner bowl ridge protruding from the bottom side of the bowl, and the base and the retainer are radially positioned between the outer bowl ridge and the inner bowl ridge.

9. The apparatus of claim 8, wherein the bowl further includes one or more bosses protruding from the bottom side of the bowl, the base further includes one or more holes, and the bosses extend through the holes.

10. The apparatus of claim 9, wherein the retainer further includes one or more pins protruding from the top side of the retainer, and the pins extend through the holes and engage the bosses.

11. The apparatus of claim 8, wherein the lid further includes a lid pad protruding from the bottom side of the lid.

12. The apparatus of claim 11, wherein the lid pad is annular and forms one or more lid gutters.

13. The apparatus of claim 8, wherein the base pads are distributed circumferentially about the base, and the base pads and the bottom side of the retainer form one or more base gutters.

14. A method of providing a container, comprising:

providing a bowl including a top side, a bottom side, and one or more bosses protruding from the bottom side of the bowl;

providing a base including a top side, a bottom side, one or more base pads protruding from the bottom side of the base, and one more holes;

positioning the base relative to the bowl such that the top side of the base is engaged with the bottom side of the bowl and the bosses extend through the holes;

providing a retainer including a top side, a bottom side, one or more openings, and one or more pins protruding from the top side of the retainer; and attaching the retainer to the bowl such that the top side of the retainer is engaged with the bottom side of the bowl, the base pads extend through the openings, the pins are engaged with the bosses, and the base is secured to the bowl.

15. The method of claim 14, further comprising providing a lid including a top side and a bottom side, wherein the lid is configured to be engaged with the top side of the bowl or the bottom side of the retainer.

16. The method of claim 15, wherein the lid further includes ribbing, and wherein the ribbing engages an inner bowl surface of the bowl when the lid is engaged with the top side of the bowl.

17. The method of claim 15, wherein the lid further includes a lid pad protruding from the bottom side of the lid.

18. The method of claim 17, wherein the lid pad is annular and forms one or more lid gutters.

19. The method of claim 17, wherein the base pads are distributed circumferentially about the base, and the base pads and the bottom side of the retainer form one or more base gutters.

20. An apparatus, comprising:

a bowl including a top side and a bottom side;

a retainer including a top side, a bottom side, and one or more openings, the top side of the retainer disposed on the bottom side of the bowl;

a base including a top side, a bottom side, and one or more base pads protruding from the bottom side of the base, the base positioned between the retainer and the bowl such that the top side of the base is disposed on the bottom side of the bowl and the bottom side of the base is disposed on the top side of the retainer; and a lid including a top side and a bottom side, the lid configured to either be disposed on the top side of the bowl or disposed on the bottom side of the retainer, wherein the base pads extend through the openings, and wherein the bowl further includes one or more bosses protruding from the bottom side of the bowl, the base further includes one or more holes, and the bosses extend through the holes.

21. The apparatus of claim 20, wherein the retainer further includes one or more pins protruding from the top side of the retainer, and the pins extend through the holes and engage the bosses.

22. The apparatus of claim 20, wherein the lid further includes a lid pad protruding from the bottom side of the lid.

23. The apparatus of claim 22, wherein the lid pad is annular and forms one or more lid gutters.

24. The apparatus of claim 20, wherein the base pads are distributed circumferentially about the base, and the base pads and the bottom side of the retainer form one or more base gutters.

* * * * *